US011005722B2

(12) United States Patent
Valisammagari et al.

(10) Patent No.: US 11,005,722 B2
(45) Date of Patent: May 11, 2021

(54) END-TO-END NETWORK SERVICE DESIGNER TOOL

(71) Applicant: Verizon Patent and Licensing Inc., Arlington, VA (US)

(72) Inventors: Srilakshmi Reddy Valisammagari, Murphy, TX (US); Mukesh Kumar, Frisco, TX (US); Ganesh Narayan, Mumbai (IN); Sanjay Ravindra Ranade, Irving, TX (US); Chetan B. Gopal, Westwood, MA (US); Amit Kapoor, Clarksburg, MD (US); Viraj Parekh, Lawrenceville, NJ (US); Shrinath Kuppa, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 87 days.

(21) Appl. No.: 15/888,371

(22) Filed: Feb. 5, 2018

(65) Prior Publication Data
US 2019/0199597 A1 Jun. 27, 2019

(30) Foreign Application Priority Data

Dec. 21, 2017 (IN) .............................. 201741046026

(51) Int. Cl.
*H04L 12/24* (2006.01)
(52) U.S. Cl.
CPC ............ *H04L 41/145* (2013.01); *H04L 41/22* (2013.01); *H04L 41/5045* (2013.01); *H04L 41/14* (2013.01)

(58) Field of Classification Search
CPC .............................. H04L 41/145; H04L 41/22
See application file for complete search history.

(56) References Cited

U.S. PATENT DOCUMENTS 10,230,585 B1 * 3/2019 A .......................... H04L 41/022
2002/0178380 A1 * 11/2002 Wolf ................... H04L 41/0213
726/4

(Continued)

OTHER PUBLICATIONS

Meier-Hellstern, Kathy, "AT&T Service Design and Creation—Speeding Up Virtual Cloud-Based Service Design", May 20, 2016, https://about.att.com/innovationblog/virtual_cloud. (Year: 2016).*

(Continued)

*Primary Examiner* — Nam T Tran

(57) ABSTRACT

A graphical network design and configuration tool provides an administrator graphical user interface (GUI) with icons that represent virtual network elements, physical network elements, and links used to deliver network-based services and associates, via the administrator GUI, the icons with network element properties based on user input. A design GUI is provided including a design canvas to arrange and connect the icons. User input is received via the design GUI to arrange the icons on the design canvas to provide a design for a network-based service. A design template for the network-based service is generated based on the second user input. A configuration GUI solicits location-specific network level attributes for network elements in the design template and creates an instance of the design template based on the network level attributes. Configuration files are automatically generated for the physical network elements represented in the instance of the design template.

20 Claims, 35 Drawing Sheets

(56) References Cited

U.S. PATENT DOCUMENTS

| | | | | |
|---|---|---|---|---|
| 2003/0093501 A1* | 5/2003 | Carlson | ............... | H04L 41/0233 |
| | | | | 709/220 |
| 2003/0115305 A1* | 6/2003 | Murray | ............... | H04L 41/0233 |
| | | | | 709/222 |
| 2005/0268238 A1* | 12/2005 | Quang | .................... | H04L 41/22 |
| | | | | 715/734 |
| 2014/0095677 A1* | 4/2014 | Croy | ....................... | H04L 41/16 |
| | | | | 709/220 |
| 2016/0072676 A1* | 3/2016 | Gomadam | ............ | H04L 41/145 |
| | | | | 709/221 |
| 2017/0289060 A1* | 10/2017 | Aftab | .................... | H04L 41/145 |

OTHER PUBLICATIONS

Guillermo A. Alvarez, Elizabeth Borowsky, Susie Go, Theodore H. Romer, Ralph Becker-Szendy, Richard Golding, Arif Merchant, Mirjana Spasojevic, Alistair Veitch, and John Wilkes, "Minerva: An Automated Resource Provisioning Tool", Nov. 2001, ACM, vol. 19, No. 4, pp. 483-485. (Year: 2001).*

* cited by examiner

FIG. 7

DESIGN PALLET
610

| Virtual 710 | Physical 720 | Hosting 730 | Transport 740 | SDWAN 750 | Links 760 | Pre-Defined Network Services 770 |
|---|---|---|---|---|---|---|
| 712 | 722 | 732 | 742 | 752 | 762 | 772 |
| 712 | 722 | 732 | 742 | 752 | 762 | 772 |
| 712 | 722 | 732 | 742 | 752 | 762 | 772 |
| 712 | 722 | 732 | 742 | 752 | 762 | 772 |
| 712 | 722 | 732 | 742 | 752 | 762 | 772 |
| 712 | 722 | 732 | 742 | 752 | 762 | 772 |

US 11,005,722 B2

END-TO-END NETWORK SERVICE DESIGNER TOOL

CROSS-REFERENCE TO RELATED APPLICATION

This application claims priority to provisional Indian Application No. 201741046026, filed Dec. 21, 2017, the disclosure of which is hereby incorporated by reference herein.

BACKGROUND

Service providers and operators are looking for ways to deliver digital transformation for their enterprise customers via an on demand end-to-end network service creation and fulfillment platform. Designing and delivering complex network services is a challenge since enterprise customers want seamless consumption, on-demand functions, and agile delivery that can keep up with their businesses.

BRIEF DESCRIPTION OF THE DRAWINGS

FIG. 7 is a simplified schematic of a design pallet for the design user interface component;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Service providers are building solutions to meet the demand of delivering network agility, rapid provisioning (such as zero-touch provisioning), and the ability to manage the complexities of "brownfield" networks (e.g., hybrid networks that combine new technology with legacy systems). According to implementations described herein, a graphical network design and configuration tool bridges the gap of a customer's business requirements and a service provider's capabilities with a unified portal that enables users to graphically create and maintain heterogeneous network services while abstracting the complexity of stitching network provisioning, service configuration, business support system (BSS), operations support system (OSS), and multiple orchestration systems.

The graphical network design and configuration tool provides a framework to design network topology, interconnect virtual network functions (VNFs) and physical network functions (PNFs), and capture network configuration details to create network services. The output of the graphical network design and configuration tool produces network service design templates (e.g., such as Topology and Orchestration Specification for Cloud Applications (TOSCA) templates, YANG templates, or other data modeling language templates), which can be consumed by the network function virtualization orchestrators (NFVOs) for automating the deployment of the service.

According to exemplary embodiment, a method, a device, and a non-transitory storage medium provide a tool for graphical network design and configuration of hybrid networks. The method, device, and non-transitory storage medium provide an administrator graphical user interface (GUI) with icons that represent virtual network elements, physical network elements, and links used to deliver network-based services and associates, via the administrator GUI, the icons with network element properties based on user input. A design GUI is provided including a design canvas to arrange and connect the icons. User input is received via the design GUI to arrange the icons on the design canvas to provide a design for a network-based service. A design template for the network-based service is generated based on the second user input. A configuration GUI solicits location-specific network level attributes for network elements in the design template and creates an instance of the design template based on the network level attributes. Configuration files are automatically generated for the physical network elements represented in the instance of the design template. The instance of the design template and the configuration files are used for automatically deploying and configuring a network for the network-based service.

Figure 1:
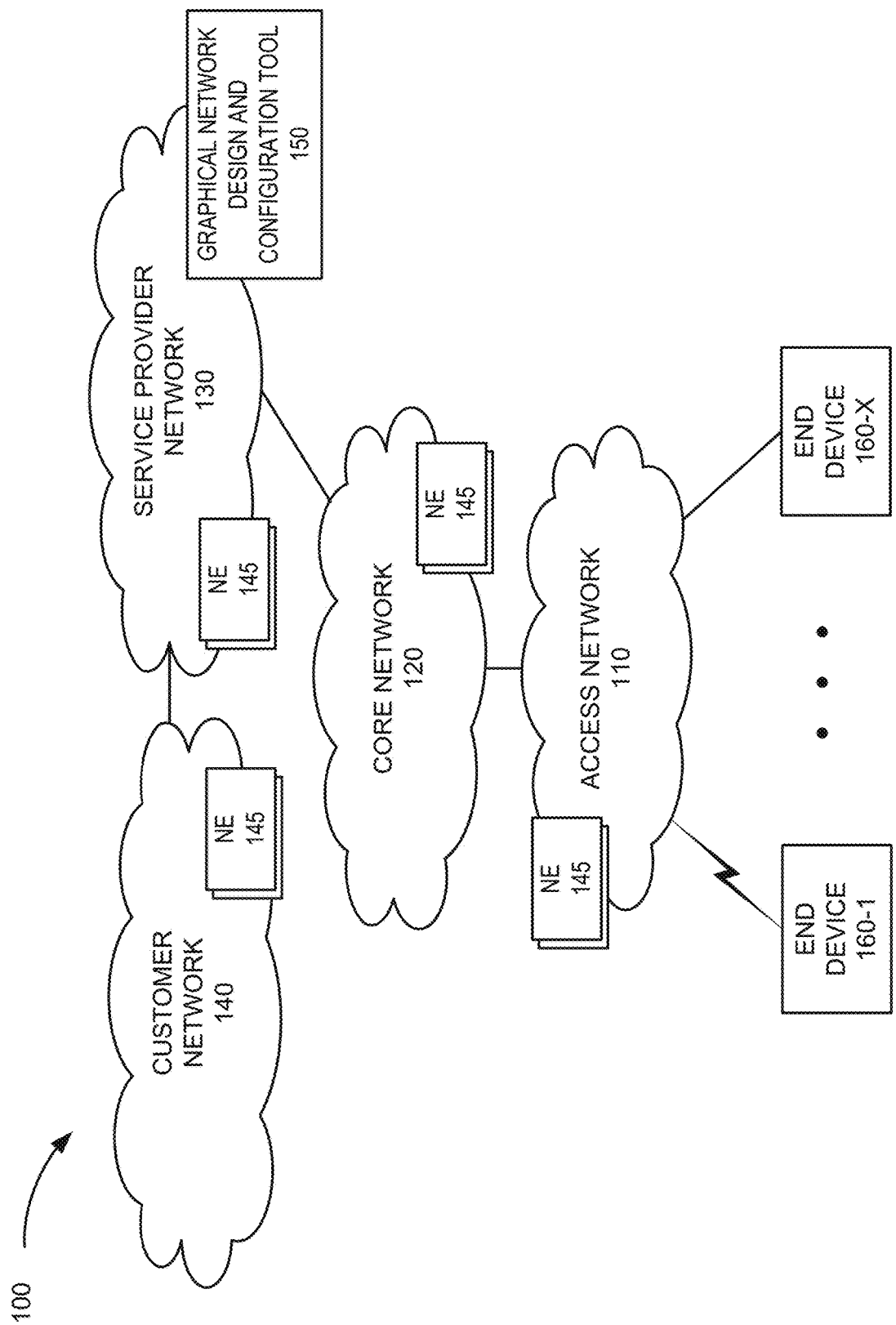
FIG. 1 is a diagram illustrating an exemplary environment in which an exemplary embodiment of a graphical network design and configuration tool may be implemented.

FIG. 1 is a diagram of an exemplary environment 100 in which systems and/or methods, described herein, may be implemented. As shown in FIG. 1, environment 100 may include an access network 110, a core network 120, a service provider network 130, an enterprise network 140, and graphical network design and configuration tool 150. Environment 100 also may include end devices 160-1 through 160-X (also referred to collectively as end devices 160 and, individually or generally as end device 160). According to other embodiments, environment 100 may include additional networks, fewer networks, differently-arranged networks, and/or different types of networks than those illustrated and described herein.

Environment 100 includes links between the networks and between the devices. Environment 100 may be implemented to include wired, optical, and/or wireless links among the devices and the networks illustrated. A communicative connection via a link may be direct or indirect. For example, an indirect communicative connection may involve an intermediary device and/or an intermediary network not illustrated in FIG. 1. Additionally, the number and the arrangement of links illustrated in environment 100 are exemplary.

Access network 110 includes one or multiple networks of one or multiple types. For example, access network 110 may be implemented to include a terrestrial network. According to an exemplary implementation, access network 110 includes a radio access network (RAN). For example, the RAN may be a Third Generation (3G) RAN, a 3.5G RAN, a Fourth Generation (4G) RAN, a 4.5G RAN, or a future generation RAN (e.g., a Fifth Generation (5G) RAN). By way of further example, access network 110 may include an Evolved UMTS Terrestrial Radio Access Network (E-UTRAN) of an Long Term Evolution (LTE) network or an LTE-Advanced (LTE-A) network, a U-TRAN, a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, an Evolution Data Optimized (EV-DO) RAN, or the like (e.g., a public land mobile network (PLMN), etc.). Access network 110 may also include other types of networks, such as a WiFi network, a local area network (LAN), a personal area network (PAN), or other type of network that provides access to or can be used as an "on-ramp" to core network 120, service provider network 130, and enterprise network 140. Depending on the implementation, access network 110 may include various types of network devices. For example, access network 110 may include a base station (BS), a base transceiver station (BTS), a Node B, an evolved Node B (eNB), a remote radio head (RRH), an RRH and a baseband unit (BBU), a BBU, and/or other type of node (e.g., wireless, wired, optical) that includes network communication capabilities.

Core network 120 includes one or multiple networks of one or multiple types. For example, core network 120 may be implemented to include a terrestrial network. According to an exemplary implementation, core network 120 includes a complementary network pertaining to the one or multiple RANs described. For example, core network 120 may include the core part of an LTE network, an LTE-A network, a CDMA network, a GSM network, a 5G network, etc. Depending on the implementation, core network 120 may include various network devices, such as a gateway, a support node, a serving node, a mobility management entity (MME), as well other network devices pertaining to various network-related functions, such as billing, security, authentication and authorization, network polices, subscriber profiles, and/or other network devices that facilitate the operation of core network 120.

Service provider network 130 includes one or multiple networks of one or multiple types. For example, service provider network 130 may be implemented to provide an application and/or a service to end devices 160. For example, service provider network 130 may be implemented to include a service or an application-layer network, a cloud network, the Internet, the World Wide Web (WWW), an Internet Protocol Multimedia Subsystem (IMS) network, a Rich Communication Service (RCS) network, a packet-switched network, a Public Switched Telephone Network (PSTN), a Signaling System No. 7 (SS7) network, a telephone network, a private network, a public network, a telecommunication network, an IP network, a wired network, a wireless network, or some combination thereof. Depending on the implementation, service provider network 130 may include various network devices that provide various applications, services, assets, or the like, such as servers (e.g., web, application, cloud, etc.), mass storage devices, and/or other types of network devices pertaining to various network-related functions.

Customer network 140 may include a wide area network (WAN), a Layer 2 and/or Layer 3 LAN, an enterprise network, or a combination of networks associated with a customer of service provider network 130. For example, customer network 140 may reside in one or more locations such as, for example, a commercial office building, an interconnected business complex, a residential home, an apartment building, a school, a shopping mall, and/or another type of location associated with the customer. Customer network 140 may include, for example, a WAN interface device (e.g., a gateway) and one or more managed customer devices. Customer network 140 may receive one or more services via a connection with service provider network 130, such as, for example, a television service, Internet service, voice communication (e.g., telephone) service, data service, etc.

Each of access network 110, core network 120, service provider network 130, and customer network 140 may include one or more network elements 145. Network elements 145 may include a device configured to perform network functions. For example, network elements 145 may include a switch, a router, a firewall, a gateway, a network address translation (NAT) device, a Reconfigurable Optical Add-Drop Multiplexer (ROADM), and/or another type of network device. Some or all of the functionality of network elements 145 may be virtualized as a VNF managed object (MO). An MO may correspond to a virtualized network node. A VNF MO may represent an LTE wireless access network node, such as an eNodeB node, an MME node, an serving gateway (SGW) node, a packet data network gateway (PGW) node, an HSS node, a Policy Charging and Rules Function (PCRF) node, an Authentication, Authorization, and Accounting (AAA) node, a Multimedia Broadcast Multicast Service (MBMS) node, a Machine Type Communication (MTC) Interworking Function (IWF) node, a Service Capability Server (SCS) node, an evolved Packet Data Gateway (ePDG) node, and/or another type of network node that may be included in a wireless access network. Furthermore, a VNF MO may represent an IMS node, such as a Call Session Control Function (CSCF) node or an application server (AS) node. Moreover, a VNF MO may represent a network node managing data traffic in a wired network, such a router, a switch, a firewall, a NAT device, a gateway, and/or another type of network device. Still further, a VNF MO may represent a network node that functions as a controller in an optical network, such as a ROADM controller. Thus, environment 100 may be considered a hybrid network in the sense that network elements 145 may be implemented as either physical or virtual nodes throughout access network 110, core network 120, service provider network 130, and customer network 140.

Graphical network design and configuration tool 150 may include one or more devices, such as computer devices and/or server devices, which provides a framework to design network topology, interconnect network elements 145 (including VNFs and PNFs), and capture network configuration details to create network services. In one implementation, graphical network design and configuration tool 150 may include a portal that can be accessed by end devices 160 or other user devices associated with customer network 140. Graphical network design and configuration tool 150 may provide a graphical user interface to allow a user to onboard network elements represented as icons, arrange the icons to design a network to provide particular services, and convert the arrangement into data models that can be used to automatically configure and provision network services. Graphical network design and configuration tool 150 is described further in connection with the subsequent figures.

End device 160 includes a device that has computational and communication capabilities. End device 160 may be implemented as a mobile device, a portable device, or a stationary device. End device 160 may be implemented as a Machine Type Communication (MTC) device, an Internet of Things (IoT) device, an enhanced MTC device (eMTC) (also known as Cat-M1), a NB-IoT device, a machine-to-machine (M2M) device, a user device, or some other type of end node. By way of further example, end device 160 may be implemented as a smartphone, a personal digital assistant, a tablet, a netbook, a wearable device, a set top box, an infotainment system in a vehicle, a smart television, a game system, a music playing system, or some other type of user device. According to various exemplary embodiments, end device 160 may be configured to execute various types of software (e.g., applications, programs, etc.). The number and the types of software may vary from one end device 160 to another end device 160.

Figure 2:
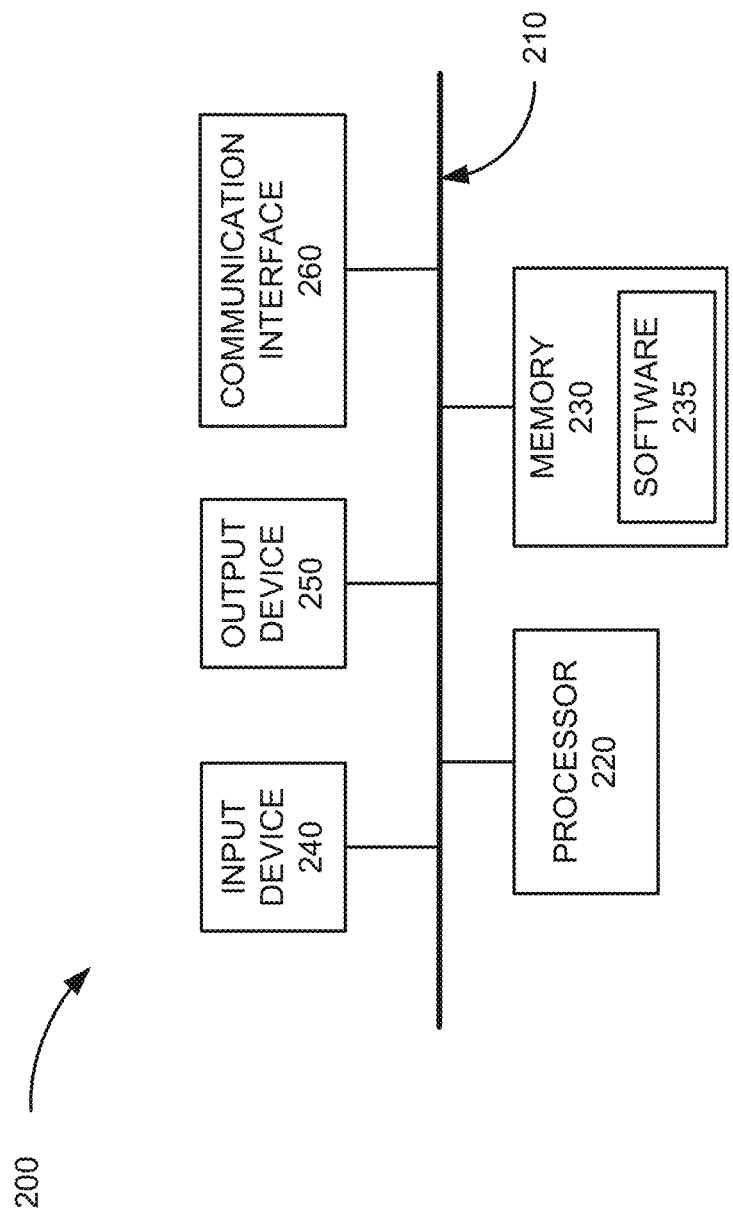
FIG. 2 is a diagram illustrating exemplary components of a device that may correspond to one or more of the devices illustrated herein.

FIG. 2 is a diagram illustrating exemplary components of device 200 according to an implementation described herein. Network element 145, graphical network design and configuration tool 150, end devices 160, and/or other devices in access network 110, core network 120, service provider network 130, and customer network 140 may each include one or more devices 200. As shown in FIG. 2, device 200 may include a bus 210, a processor 220, a memory 230 with software 235, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. For example, processor 220 may include one or more Central Processing Units (CPUs) and/or one or more Graphics Processing Units (GPU). In other embodiments, processor 220 may include an application-specific integrated circuit (ASIC), a field-programmable gate array (FPGA), and/or another type of integrated circuit or processing logic. Processor 220 may control operation of device 200 and its components.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Software 235 includes an application or a program that provides a function and/or a process. Software 235 may also include firmware, middleware, microcode, hardware description language (HDL), and/or other form of instruction. By way of example, with respect to the network elements that include logic to provide virtual network functions, these network elements may be implemented to include software 235. Additionally, for example, end device 160 may include software 235 (e.g., an application to communicate with graphical network design and configuration tool 150, etc.) to perform tasks as described herein.

Input device 240 may allow an operator to input information into device 200 and/or to collect information from the environment using one or more sensors. Input device 240 may include, for example, buttons (e.g., a keyboard, keys of a keypad, control buttons, etc.), a mouse, a pen, a joystick, a tracking pad, a stylus, a remote control, a microphone or another audio capture device, an image and/or video capture device (e.g., a camera), a touch-screen display, a light sensor, a gyroscope, an accelerometer, a proximity sensor, a temperature sensor, a barometer, a compass, a health sensor (e.g., pulse rate monitor, etc.), and/or another type of input device. In some implementations, device 200 may be managed remotely and may not include input device 240. In other words, device 200 may be "headless" and may not include a keyboard, for example.

Output device 250 may output information to an operator of device 200 and/or to control device 200 and/or the environment using one or more actuators. Output device 250 may include a display, a printer, a speaker, an actuator to cause device 200 to vibrate, a motor to cause part of device 200 to move, a lock device, and/or another type of output device. For example, device 200 may include a display, which may include a liquid-crystal display (LCD), a light emitting diode (LED) display, an organic LED (OLED) display, an electrophoretic (e.g., electronic ink) display, and/or another type of display device for displaying content to a user. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to an antenna for transmitting and receiving RF signals. For example, if device 200 is included in end device 160, communication interface 260 may include an antenna assembly that includes one or more antennas to transmit and/or receive RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a Wi-Fi) card for wireless communications. Communication interface 260 may also include a universal serial bus (USB) port for communications over a cable, a Bluetooth™ wireless interface or an interface for another type of short range (e.g., less than 100 meters) wireless communication method, a radio-frequency identification (RFID) interface, a near-field communications (NFC) wireless interface, a Global Positioning System (GPS) receiver to obtain location information from GPS satellites, an optical transceiver, and/or any other type of interface that converts data from one form to another form.

As will be described in detail below, device 200 may perform certain operations relating to graphical network design and configuration tools. Device 200 may perform these operations in response to processor 220 executing software instructions (e.g., software 235) contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
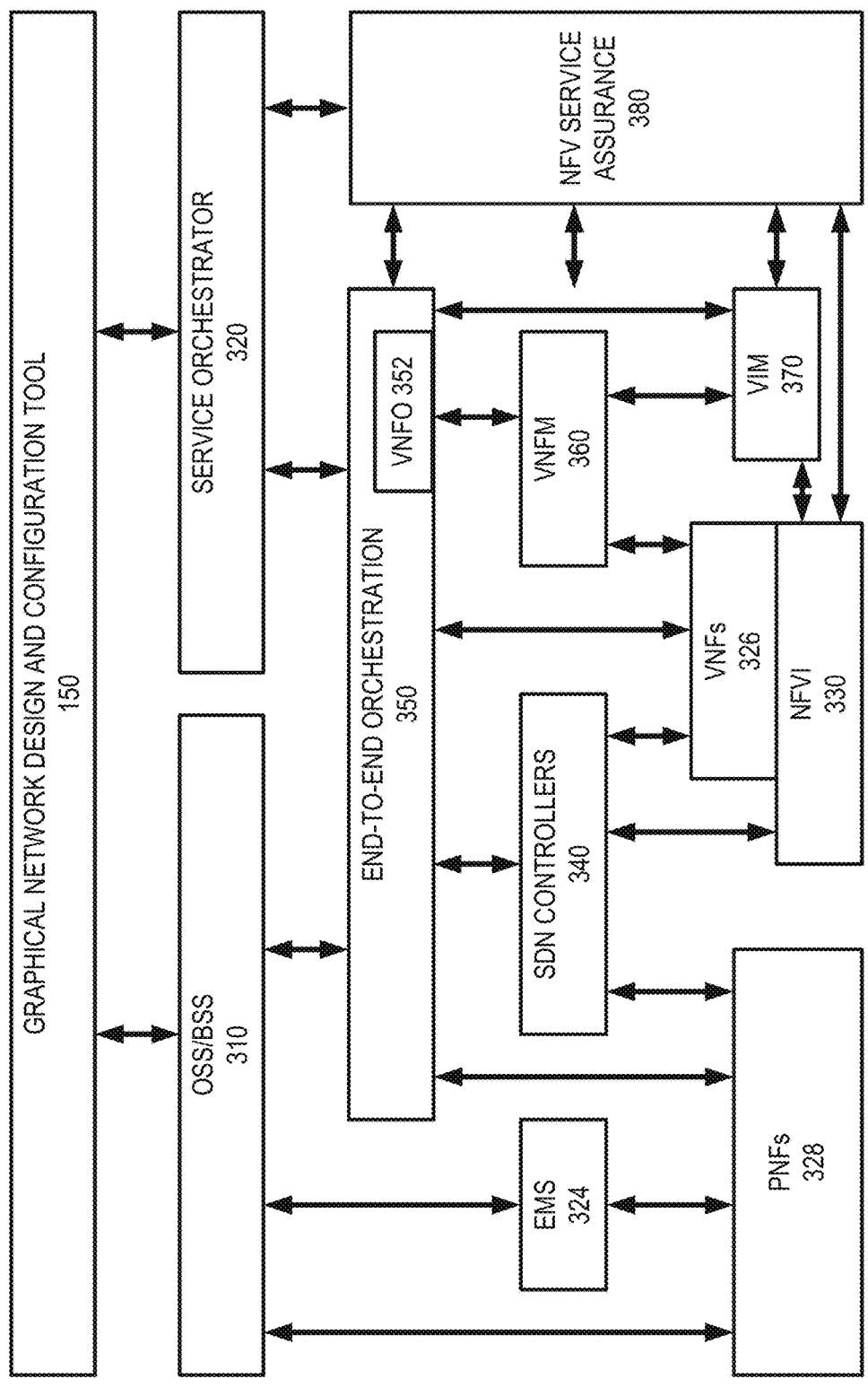
FIG. 3 is a diagram illustrating exemplary functional components of a virtualized network function architecture that may be used in the environment of FIG. 1.

FIG. 3 is a diagram illustrating exemplary functional components of a network function virtualization (NFV) architecture system 300, according to an implementation. NFV architecture system 300 may be distributed within one or multiple networks of environment 100. The functional components of NFV architecture system 300 may be implemented, for example, via processor 220 executing instructions from memory 230. Alternatively, some or all of the functional components included in NFV architecture system 300 may be implemented via hardwired circuitry. In some implementations, NFV architecture system 300 may be implemented by one or more network elements 145. In other implementations, NFV architecture system 300 may be implemented by one or more other devices, such as, graphical network design and configuration tool 150 in conjunction with network elements 145.

As shown in FIG. 3, NFV architecture system 300 may include graphical network design and configuration tool 150, an operations support system (OSS)/business support system (BSS) 310, a service orchestrator 320, Element Management Systems (EMS) 324, VNFs 326, PNFs 328, NFV Infrastructure (NFVI) 330, software defined network (SDN) controllers 340, end-to-end orchestration module 350, VNF manager (VNFM) 360, virtualization infrastructure manager (VIM) 370, NFV service assurance 380, and graphical network design and configuration tool 150.

OSS/BSS 310 may include an OSS and/or BSS. The OSS may include a network monitoring system, a network provisioning system, a network management system, a self-optimized network (SON) system, etc. The BSS may include an ordering system, a customer service system, and/or a billing system. OSS/BSS 310 may manage the physical components of access network 110, core network 120, service provider network 130, and/or customer network 140.

Service orchestrator 320 may include a network services orchestrator device that is responsible for service management functions including service registration, server placement, service lifecycle management and monitoring.

EMS 324 and VNF 326 may each include a VNF MO. Each EMS 324 may manage a PNF 328. VNF 326 may include the implementation of network functions performed by the VNF MO. For example, if NFV architecture system 300 is used for a wireless access network (e.g., access network 110), a first VNF 326 may correspond to a virtualized eNodeB, a second VNF 326 may correspond to a virtualized MME, a third VNF 326 may correspond to a virtualized SGW, a fourth VNF 326 may correspond to a virtualized PGW, a fifth VNF 326 may correspond to an HSS, etc.

NFVI 330 may include hardware (e.g., processors, memory, storage components, networking components, etc.) and software components on which VNFs 326 are deployed. For example, NFVI 330 may include the hardware and software components included in one or more cloud center devices (e.g., one of network elements 145).

SDN controllers 340 may include one or more applications to manage flow controls, restrict access, and create/modify/delete VNFs 326, PNFs 328, and/or NFVI 330.

End-to-end orchestration module 350 may include one or more VNF orchestrators (VNFO) 352 that may perform orchestration of NFV to ensure that sufficient resources are available to provide a network service and that a particular network function is deployed, changed, or removed. Thus, end-to-end orchestration module 350 may coordinate requests received via OSS/BSS interface 310 with VNFM 360 and VIM 370.

VNFM 360 may manage VNFs 326. VNF manager 360 may perform lifecycle management of particular VNFs 326, including instantiation, scaling, updating, and/or termination of particular VNFs 326 based on instructions received from orchestrator 350. VNF manager 360 may VIM 370 may manage NFVI 330. For example, VIM 370 may maintain a mapping of VNFs 326 to physical resources and may orchestrate the allocation, updating, and/or release of NFVI resources.

NFV service assurance 380 may include one or more systems to assure services orchestrated in NFV architecture system 300 are provided and maintained. NFV service assurance 380 may provide active and passive monitoring for physical and virtual functions in NFV architecture system 300, manage faults, ensure performance is within policy limits, etc.

Graphical network design and configuration tool 150 may communicate with OSS/BSS 310 and service orchestrator 320 to provide location-specific instances of a network service design, configuration files, and other information that may be used for automatic provisioning and configuration of network services.

Although FIG. 3 shows exemplary components of NFV architecture system 300, in other implementations, NFV architecture system 300 may include fewer components, different components, additional components, or differently arranged components than depicted in FIG. 3. Additionally or alternatively, one or more components of NFV architecture system 300 may perform one or more tasks described as being performed by one or more other components of NFV architecture system 300.

Figure 4:
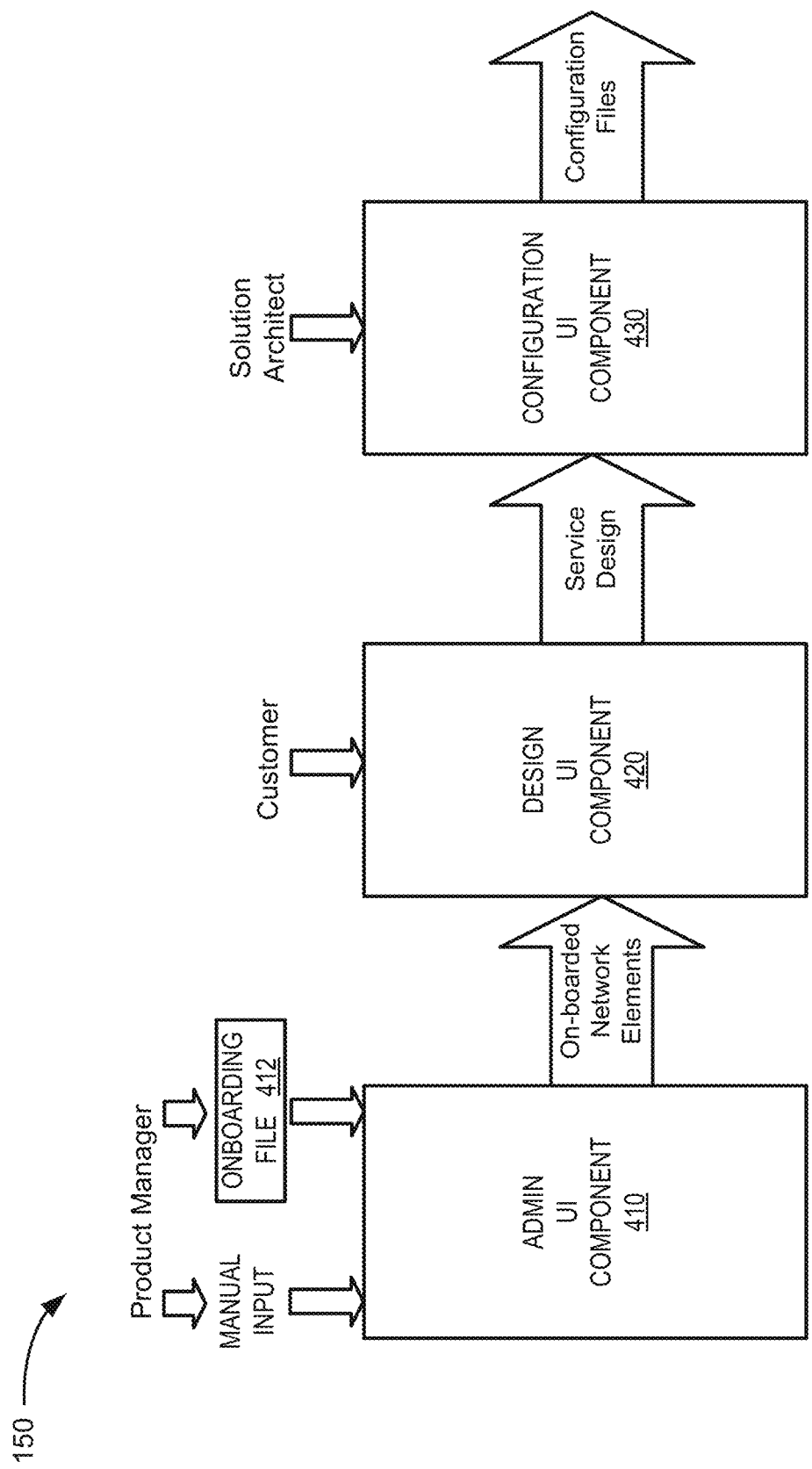
FIG. 4 is a diagram illustrating exemplary components of an exemplary embodiment of a graphical network design and configuration tool.

FIG. 4 is a block diagram illustrating user interface components of graphical network design and configuration tool 150. As shown in FIG. 4, graphical network design and configuration tool 150 may include an administrator user interface (UI) component 410, a design UI component 420, and configuration UI component 430.

Administrator UI component 410 may enable administrative features of graphical network design and configuration tool 150. According to one aspect, administrator UI component 410 may facilitate onboarding of networking elements and network services for use with graphical network design and configuration tool 150. Onboarding of different design elements, including networking elements (such as PNFs, VNFs, etc.) and network services, provides the building blocks for a customer to design an end-to-end service. According to one implementation, onboarding involves incorporating TOSCA-based deployment templates for each of the design elements with their network service descriptors (NSDs), virtual network functions descriptors (VNFDs), and virtual network link descriptors (VNLDs).

Onboarding of design elements is necessary to ensure that every network element is published, cataloged and modeled for graphical network design and configuration tool 150. Each network element may be modeled to capture parameter details for a complete ecosystem (e.g., network environment 100). Parameter details may include, for example and without limitation, customer information; number of site types—location information; network solution parameters; deployment descriptors; connection points/interfaces; reference to initial configurations; software version; licensing information; provider network details; virtual private network (VPN) and virtual private local area network (VPLAN) port details, quality of service (QOS) details, protocol details; LAN connectivity details; performance/monitoring parameters; quoting and ordering details—pricing, product & site configuration; customer premises equipment (CPE) details; transport details and access details; Day 0, Day 1, 2 and policy configurations; orchestrators parameters—virtual network descriptors; and flow path details.

As shown in FIG. 4, onboarding of network elements may be the task of a network administrator or product manager. Administrator UI component 410 provides the capability for product managers to upload icons of network elements, choose a placeholder tab in a design palette (see, e.g., tabs 710, 720, 730, 740, 750, 760, and 770 of design pallet 610 in FIG. 7), and (optionally) to manually add categories with associated properties. Additionally, or alternatively, administrator UI component 410 provides a capability to import and export properties for any network element. In one implementation, network element properties may be imported using an onboarding file 412. Onboarding file 412 may include, for example, a formatted spreadsheet or another type of data file. In one implementation, onboarding file 412 may include all the categories and associated properties for a network element with details such as a description, default values, tool tips, mandatory fields, drop down details, reference to table, and indication for repetition of block of properties. Successful importing of onboarding file 412 allows for onboarding of multiple network elements simultaneously and enables a user to start using the network element via design UI component 420.

Figure 5:
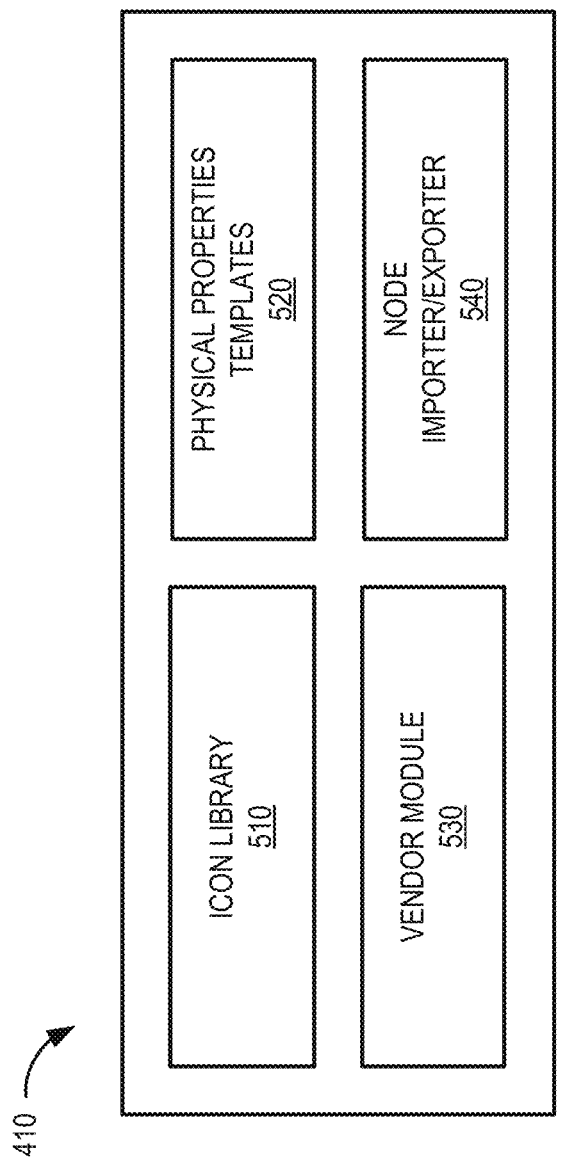
FIG. 5 is a block diagram illustrating exemplary logical components of an administrative user interface component of FIG. 4.

FIG. 5 is a block diagram of administrator UI component 410. Administrator UI component 410 may provide a graphical user interface (GUI) or a non-graphical user interface, such as a text-based interface. As shown in FIG. 5, administrator UI component 410 may include an icon library 510, physical properties templates 520, a vendor module 530, and a node importer/exporter 540.

Icon library 510 may store a library of icons available for association with network elements. Icon library 510 may include, for example, representations of standard virtual and physical network elements. In one implementation, users may import additional icons into icon library 510.

Physical properties templates 520 may include a list of fields and/or data structures associated with physical network devices and physical network functions. For example, physical properties templates 520 may provide a structure for soliciting (e.g., from am a user) properties of network elements to be associated with an icon from icon library 510.

Vendor module 530 may provide a portal for vendors of network services to provide standardized and pre-validated templates for any products or combination of products, which are ready to be offered to customers as network solutions. Vendor module 530 may include a catalog or directory of available vendor templates that may be used by customers to provision a network for selected network services. Customers may provide network attributes for their particular location(s) to the vendor templates to generate a location-specific instance of the design template that can be used for automatic provisioning of the network service.

Node importer/exporter 540 may facilitate onboarding of icon properties for similar network elements. For example, node importer/exporter 540 may provide a user interface to export network properties associated with an icon to an external data file, such as a spreadsheet, database, or flat text file. Node importer/exporter 540 may also import network properties for multiple icons from a data file (e.g., onboarding file 412). In one implementation, a user may export a data file for a particular icon (e.g., associated with a common network element). The user may edit selected fields of the external data file and copy duplicate network properties in the data file to create onboarding file 412 with definitions for one or more new icons. Node importer/exporter 540 may be used to upload/onboard onboarding file 412 including the new icon definitions.

Figure 6:
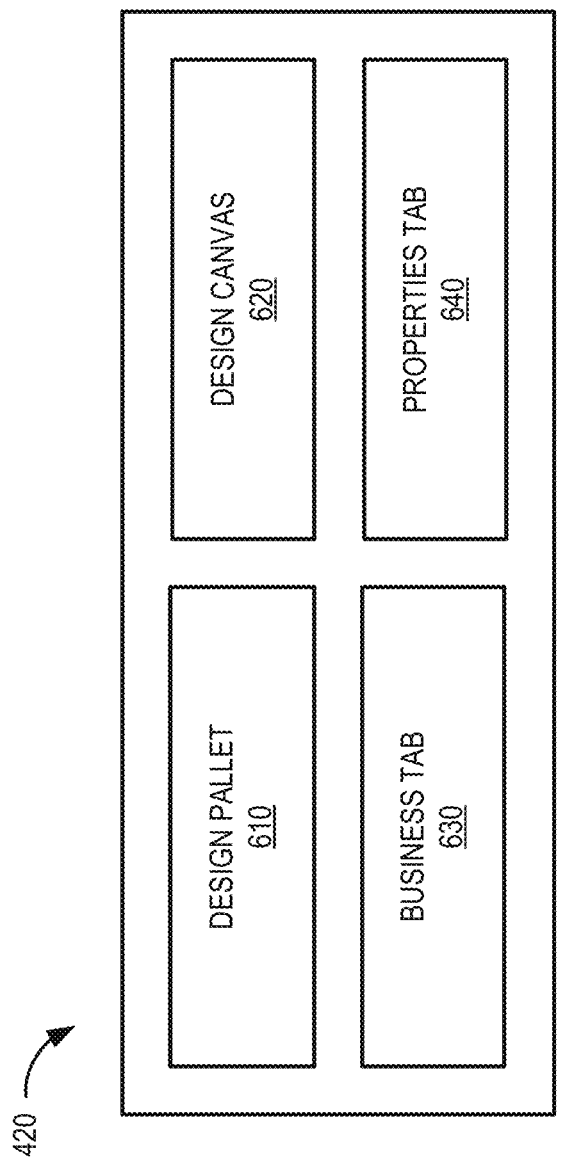
FIG. 6 is a block diagram illustrating exemplary logical components of a design user interface component of FIG. 4.

Referring again to FIG. 4, design UI component 420 may provide a workspace to design a network topology using on-boarded network elements from administrator UI component 410. Design UI component 420 is described further in connection with FIG. 6, which is a block diagram of design UI component 420. Design UI component 420 may include a graphical user interface (GUI) or a non-graphical user interface, such as a text-based interface. As shown in FIG. 6, design UI component 420 may include a design pallet 610, a design canvas 620, a business tab 630, and a properties tab 640.

Design pallet 610 may show different on-boarded network elements that may be selected by a customer/user to design and configure network services. Generally, design pallet 610 provides network elements needed to create a network diagram. Before an icon for a network element can be made available in design pallet 610, the network element must be on-boarded with particular information. According to an implementation described herein, each network element may be on-boarded using a spreadsheet template (e.g., onboarding file 412) to categorize network elements and capture all relevant parameters.

Design pallet 610 is described further in connection with FIG. 7. As shown in FIG. 7, design pallet 610 may be divided into tabs such as a virtual tab 710, a physical tab 720, a hosting tab 730, a transport tab 740, an software defined WAN (SDWAN) tab 750, a links tab 760, and a pre-defined network services tab 770. Each of virtual tab 710, physical tab 720, hosting tab 730, transport tab 740, SDWAN tab 750, links tab 760, and pre-defined network services tab 770 may include icons grouped by types of network elements to allow for logical selection by a user. Different tabs/grouping may be used in other configurations. Each icon in design pallet 610 may represent a network element (along with all its corresponding parameters) on-boarded via administrator UI component 410.

Virtual tab 710 may include icons 712 for virtual offerings of a service provider (e.g., operating service provider network 130), such as a virtual router, a virtual firewall, a WAN optimization function, an intrusion detection system (IDS), a deep packet inspection (DPI) function, a virtual switch, a Layer 2/3 router, a load balancer, and wireless access points, etc.

Physical tab 720 may include icons 722 for physical offering of the service provider, such as a router, a firewall, WAN optimizer, an IDS, a DPI device, intrusion prevention systems (IPS), a switch, a Layer 2/3 router, a load balancer, and wireless access points, a secured gateway, network tap devices, a LAN, an IP-phone, a wireless router, a mobile device, a session border controller (SBC), etc.

Hosting tab 730 may include icons 732 for devices or systems that may host network services. Icons 732 may include icons for customer premises, universal CPE, hosted network services, managed services, and third party data centers.

Transport tab 740 may include icons 742 relating to Network Transport Connectivity. Transport icons, representing connectivity between locations which are geographically spread, may include a service provider multiprotocol label switching (MPLS) network, a third party MPLS network, a dedicated Internet network, a service provider's wireless network, a service provider's satellite network, an Internet network, etc.

SDWAN tab 750 may include icons 752 for different SDWAN solutions offered by a service provider. In one implementation, vendor-specific solutions, such as edge routers and controllers for particular vendors (e.g., VIPTELA, IWAN, VERSA, etc.) may be included.

Links tab 760 may include icons 762 for different kinds of access links offered by the service provider, such as secured connection, Ethernet, satellite, Wi-Fi, Evolution-Data Optimized (EVDO), DSL, dial-up, TDM, E-line, E-LAN, Ethernet, Optical Sonnet, Secured Cloud Interconnect Pre-defined Network Services tab 770 may include icons 772 for selections of pre-defined templates or network services available to be used by users. These pre-defined templates or network services are the network design solutions, which are ready to be used for any enterprise customers.

In other implementations, different tabs/groupings of icons representing network elements and services may be included in design pallet 610. For example, in another implementation, icons 712, 722, 732, 742, 752, 762, and 772 may be sorted alphabetically with or without tabbed groupings. In another implementation, other tabs, such as a tools tab may be included with overlapping icons from other of tabs 710, 720, 730, 740, 750, 760, and 770. The tools tab may include, for example, some of the supporting icons for grouping network elements while designing the solutions, Subnet, and labels.

Although selections available with each of tabs 710, 720, 730, 740, 750, 760, and 770 are shown in FIG. 7 as being simultaneously visible, in other implementations, screen (e.g., display) space may be preserved by presenting icons from only one of tabs 710, 720, 730, 740, 750, 760, or 770 at a time in design pallet 610.

Figure 8:
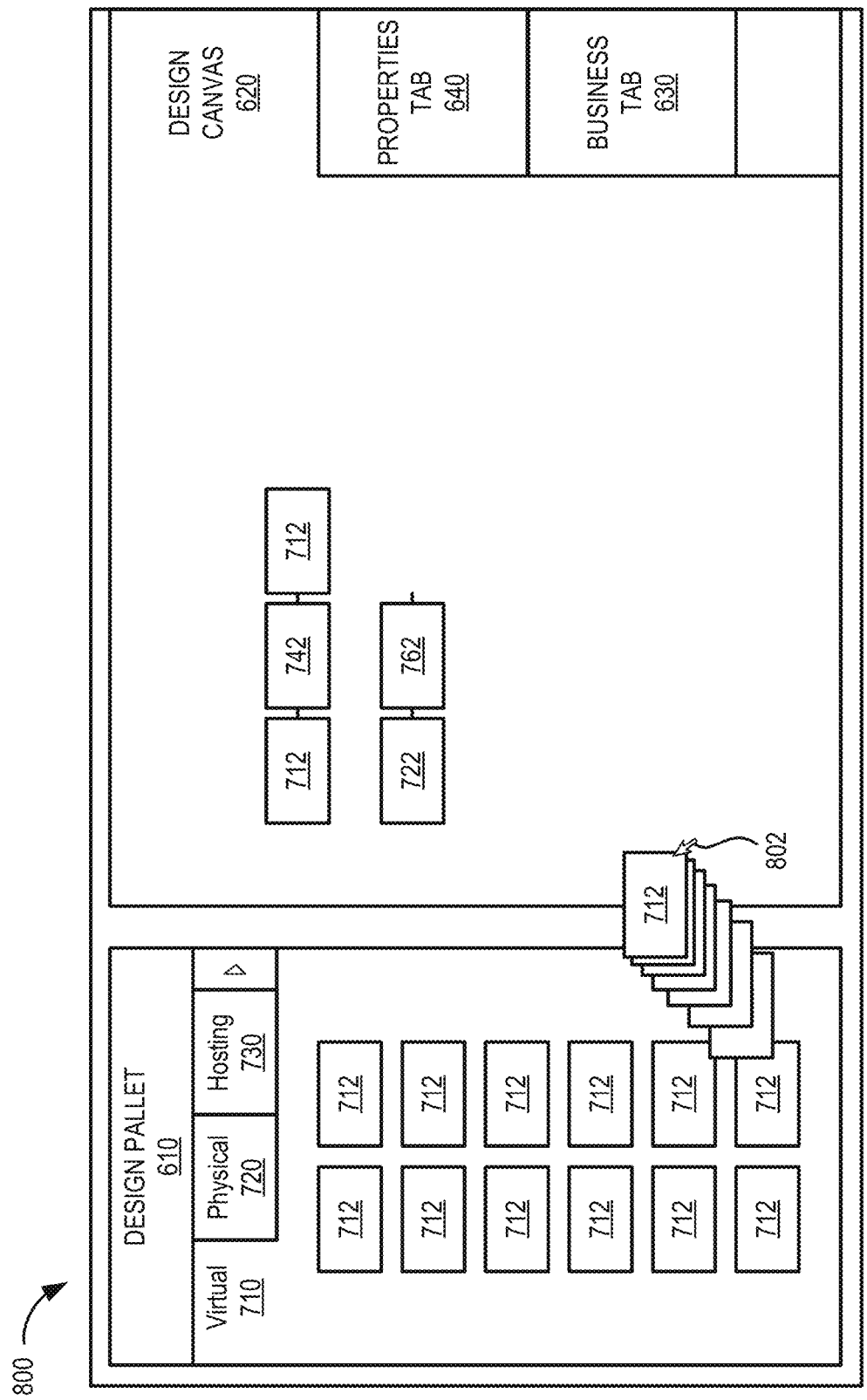
FIG. 8 is a simplified schematic of a user interface that may be generated by the design user interface component.

Design canvas 620 provides a visible workspace for a user to drag and drop icons 712, 722, 732, 742, 752, 762, and 772 (e.g., representing network elements, connectivity, links, etc.) to create network solutions for customers. Design canvas 620 may be interactive and can be considered the main module of design pallet 610 where the user can create easy to complex network solutions. FIG. 8 provides a simplified illustration of a drag and drop procedure using a user interface 800 generated by design user interface component 420. A user may use a pointer 802 (e.g., a mouse pointer, a finger, a tablet pen, etc.) to select an icon (e.g., one of icons 712) from design pallet 610 and place the icon within design canvas 620. Links to join each icon may be selected from another one of tabs 710, 720, 730, 740, 750, 760, or 770. Graphical network design and configuration tool 150 may use parameters associated with each icon 712, 722, 732, 742, 752, 762, and 772 (along with selected links) to generate and verify a service design.

Returning to FIG. 6, business tab 630 contains information related to identifying a customer, quotes, and ordering identifiers that differentiate one network design from another.

Properties tab 640 is a placeholder to capture details of each device, design, instance, link, etc., such as product catalog details, device details, network service descriptors (NSD), virtual network functions descriptor (VNFD), deployment descriptors, virtual network functions forwarding graph (VNFFG) information, link descriptors, and policy information.

Returning to FIG. 4, configuration UI component 430 may assemble configuration files (e.g., a command line interface (CLI) configuration file) based on a service design from design canvas 620. For example, configuration UI component 430 may allow a user to identify a particular device (e.g., selecting an icon from design canvas 620). Configuration UI component 430 may provide an interface to solicit network element configuration information, including device properties, using formatted data fields associated with the type of network element. Configuration UI component 430 may prompt a user to save the configuration information for the particular network element and select a configuration generator option. Selection of the configuration generator option may cause configuration UI component 430 to generate a configuration file (e.g., a CLI configuration file) based on the stored network element configuration information. The configuration file can be used either by an implementation engineer or automated tool to automatically configure the network element. This particular feature lends itself to not just automation, but also provides consistency for different types of customers.

Configuration UI component 430 may also add location information to design templates to provide location-specific instances of a network service design. For example, service providers have different types of customers, such as small, medium, large, and very large. Very large customers have customized configurations compared, for example, to small and medium with standard configuration templates. For a given network, there are certain standards and requirements for the configuration of the managed network elements. Much of this configuration will be common across an enterprise, but there will be sub-classes needed based on device type, platform, line of business, role, etc., that can significantly complicate and impede configuration management and auditing. Thus, according to an implementation, the configuration can be decomposed and arranged in to related functional groups, which can then be made in to a configuration template. This arrangement allows a template to be used and reused, across device classes and roles, while only maintaining a single copy of the template, reducing administration overhead and limiting the potential for errors.

Figure 9:
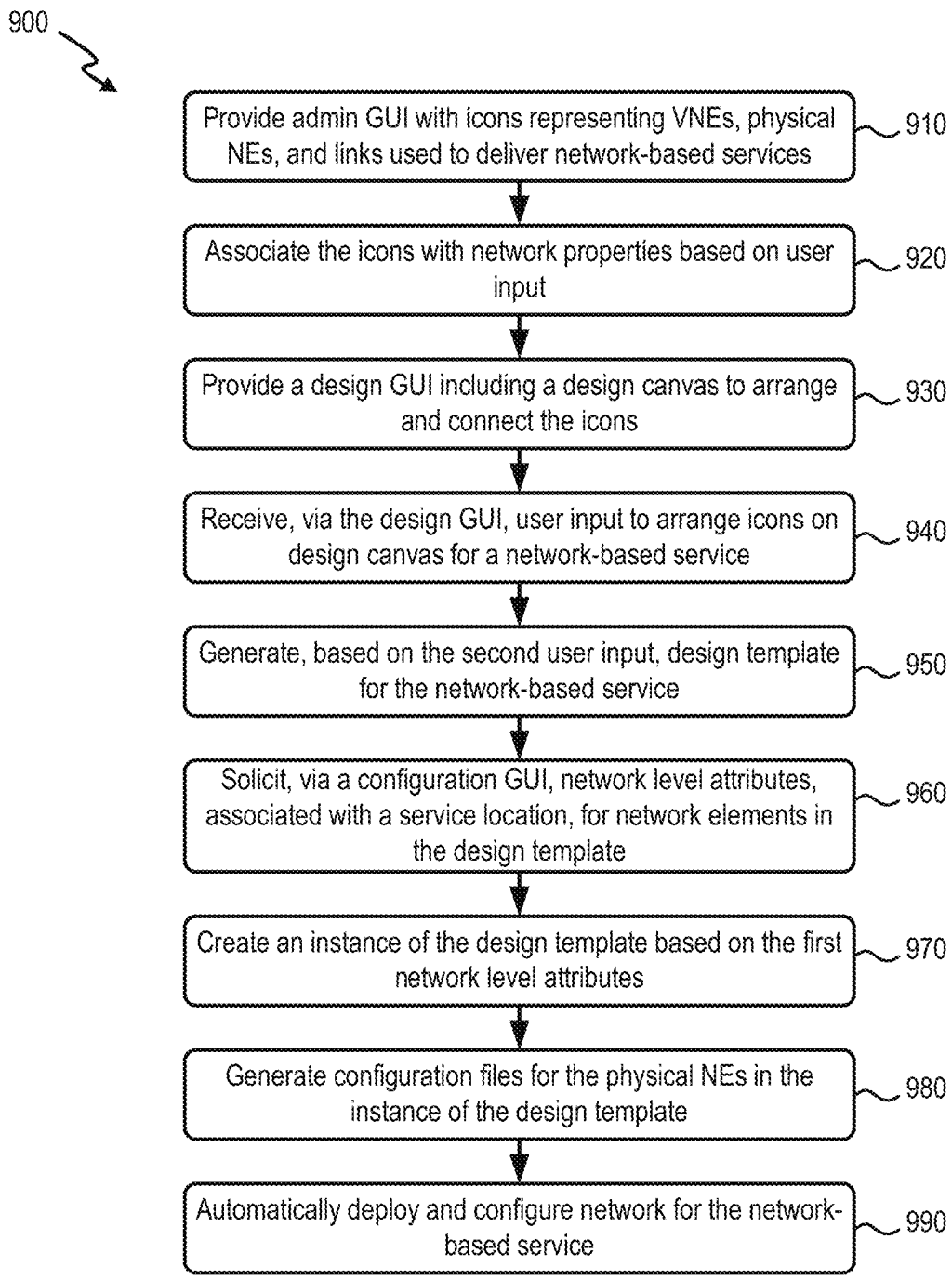
FIG. 9 is a flow diagram illustrating an exemplary process for using the graphical network design and configuration tool of FIG. 1.

FIG. 9 is a flow diagram illustrating an exemplary process 900 for using graphical network design and configuration tool 150, according to an implementation described herein. In one implementation, process 900 may be implemented by graphical network design and configuration tool 150. In another implementation, process 900 may be implemented by graphical network design and configuration tool 150 and end device 160. In still other implementations, process 900 may be implemented by graphical network design and configuration tool 150 in conjunction with one or more other devices in NFV architecture system 300. Some process blocks of FIG. 9 may be described in the context of FIGS. 10A-10K, 11, 12A-12K, and 13A-13C, which include annotated screen shots of exemplary user interfaces generated by administrator UI component 410, design UI component 420, and configuration UI component 430.

Figure 10A:
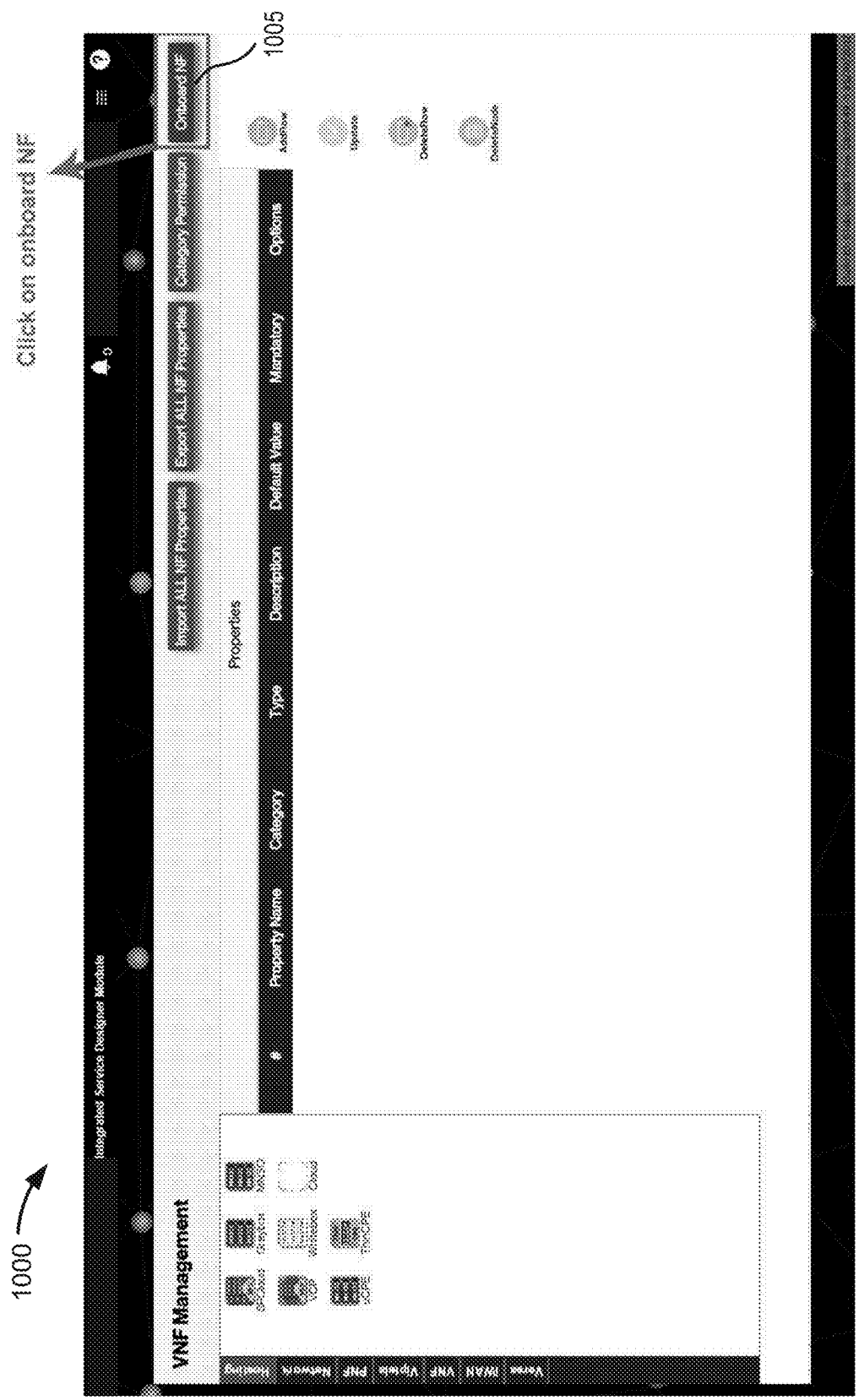
FIG. 10A-10K are examples of screen images generated by the administrator user interface component of the graphical network design and configuration tool.
Figure 10B:
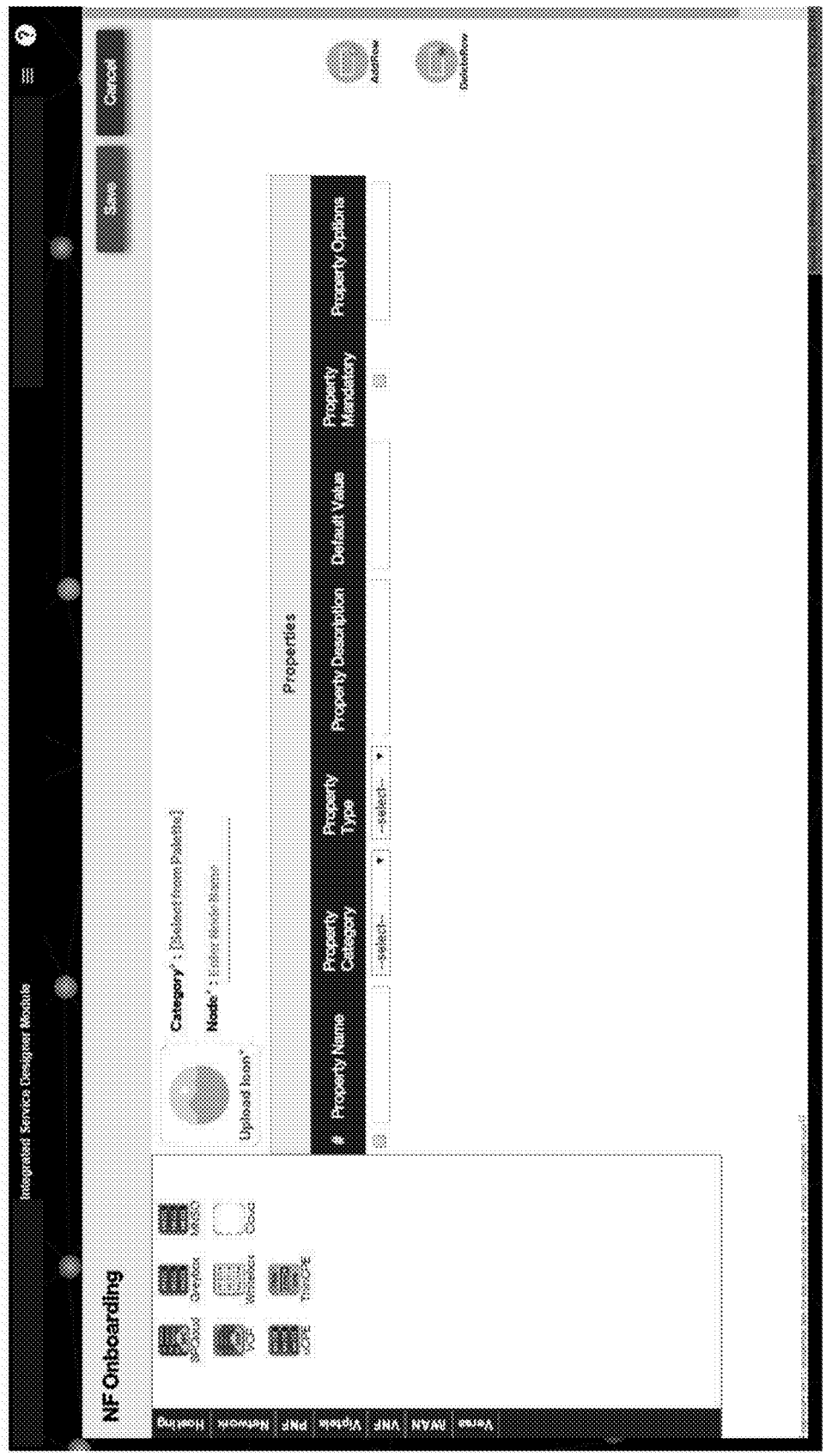

Referring to FIG. 9, process 900 may include providing an administrator GUI with icons that represent virtual network elements, physical network elements, and links used to deliver network-based services (block 910). For example, FIGS. 10A-10K provide sample screen shots of an administrator user interface that may be generated by administrator UI component 410. More particularly, FIGS. 10A-10K depict a sequence of user actions for onboarding a network function. As shown in FIG. 10A an administrator user interface 1000 may include an onboard network function (NF) option 1005, which may be selected by a user to launch an NF onboarding screen 1010 of FIG. 10B.

Figure 10C:
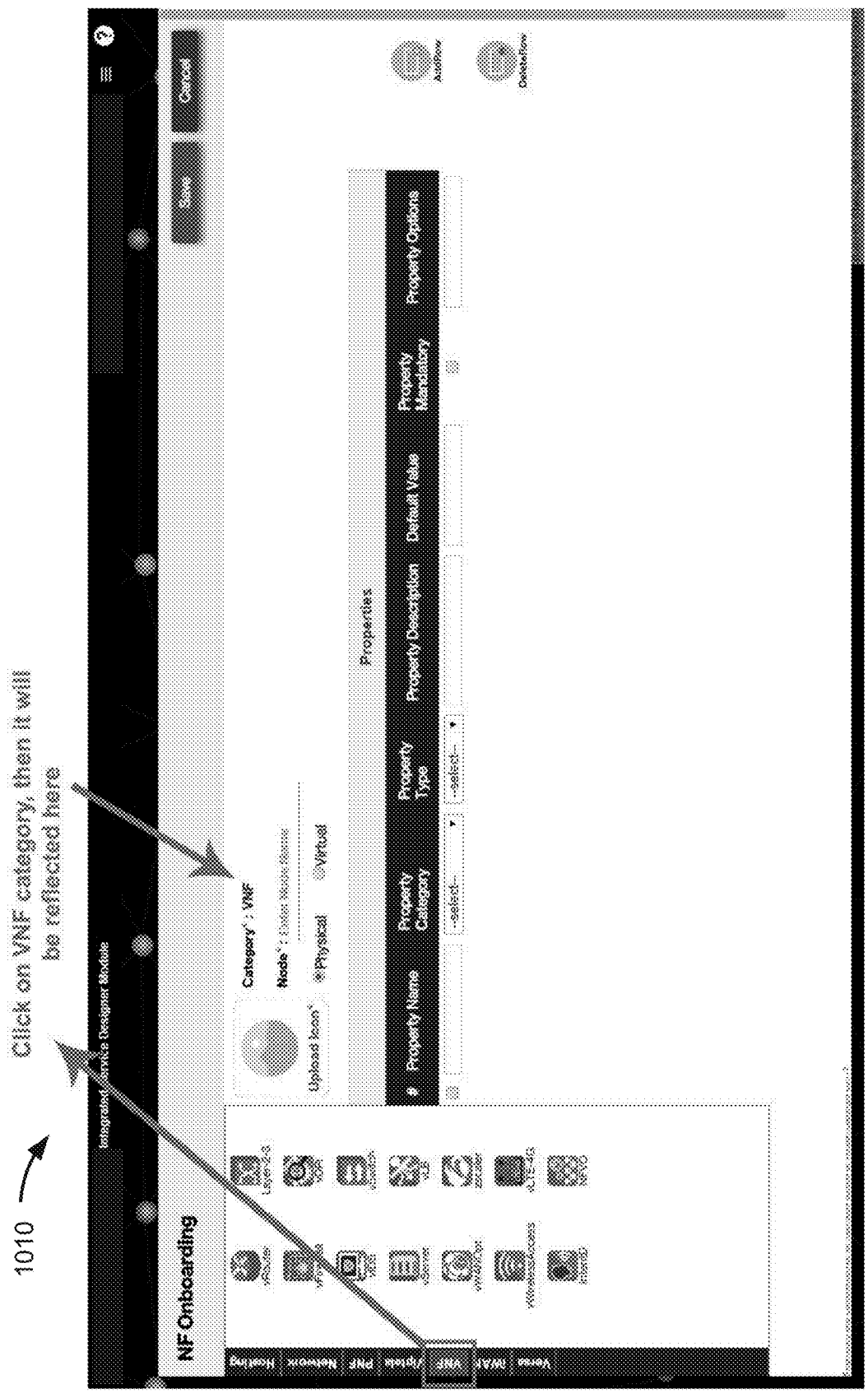
Figure 10D:
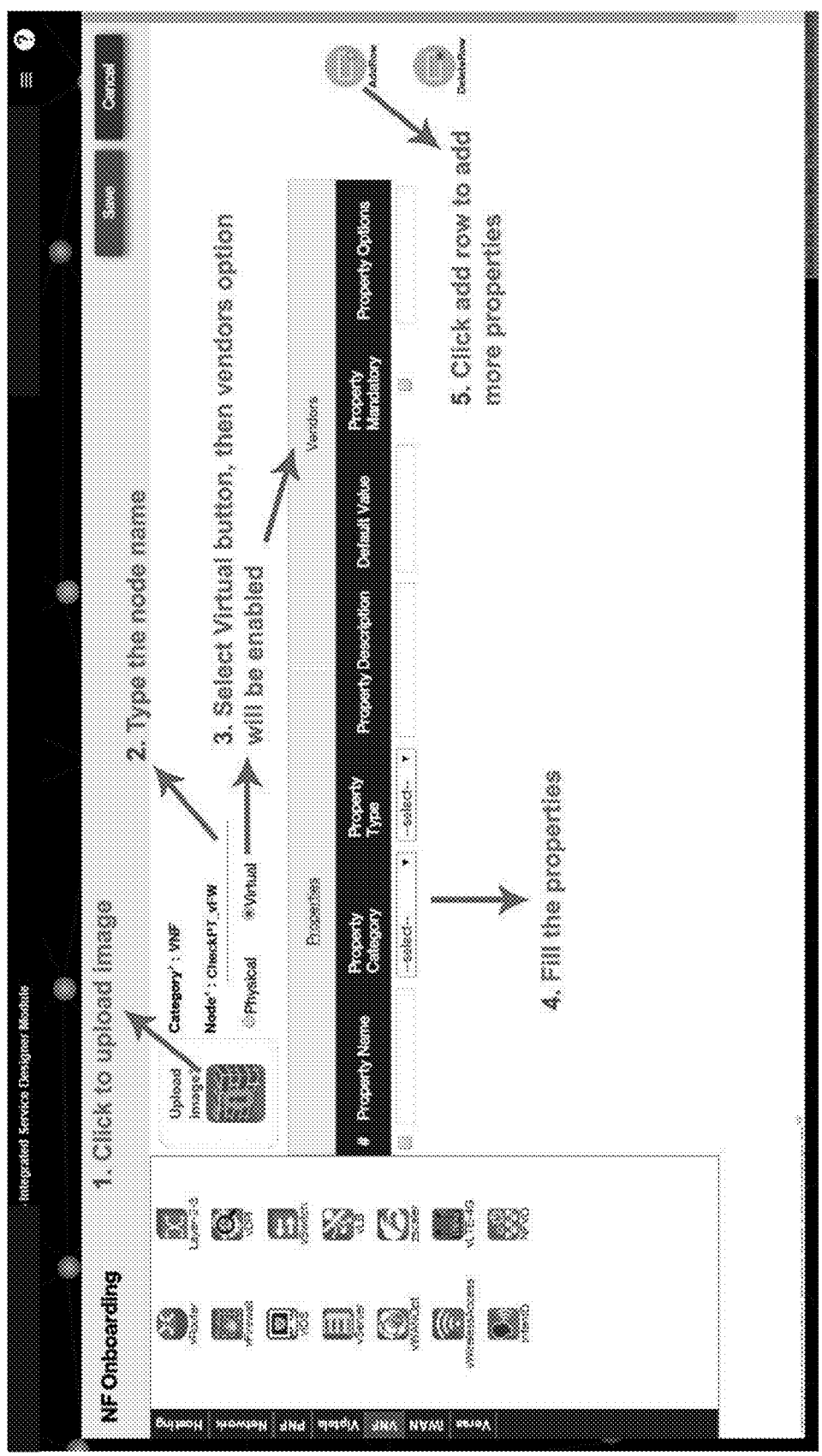
Figure 10E:
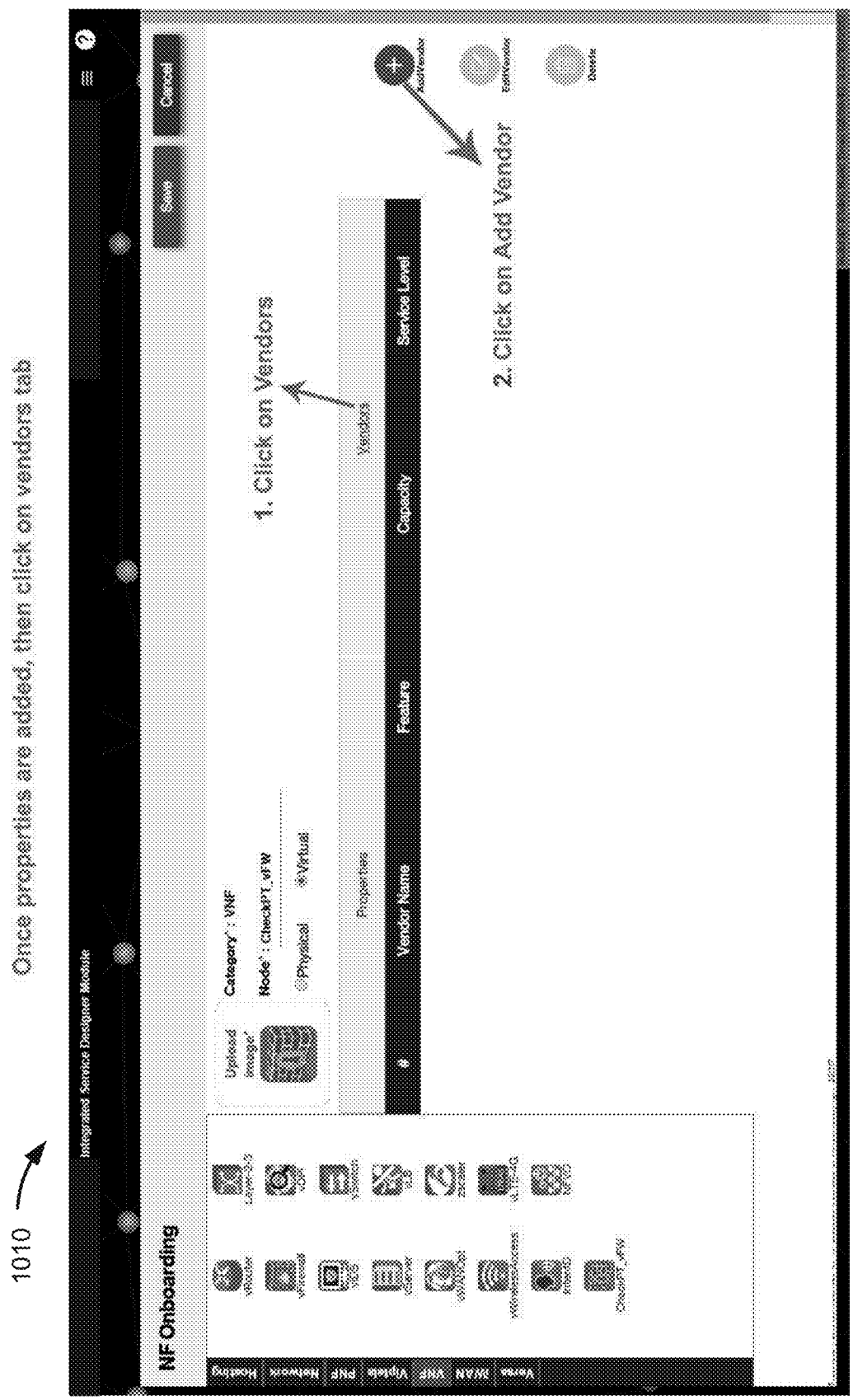
Figure 10F:
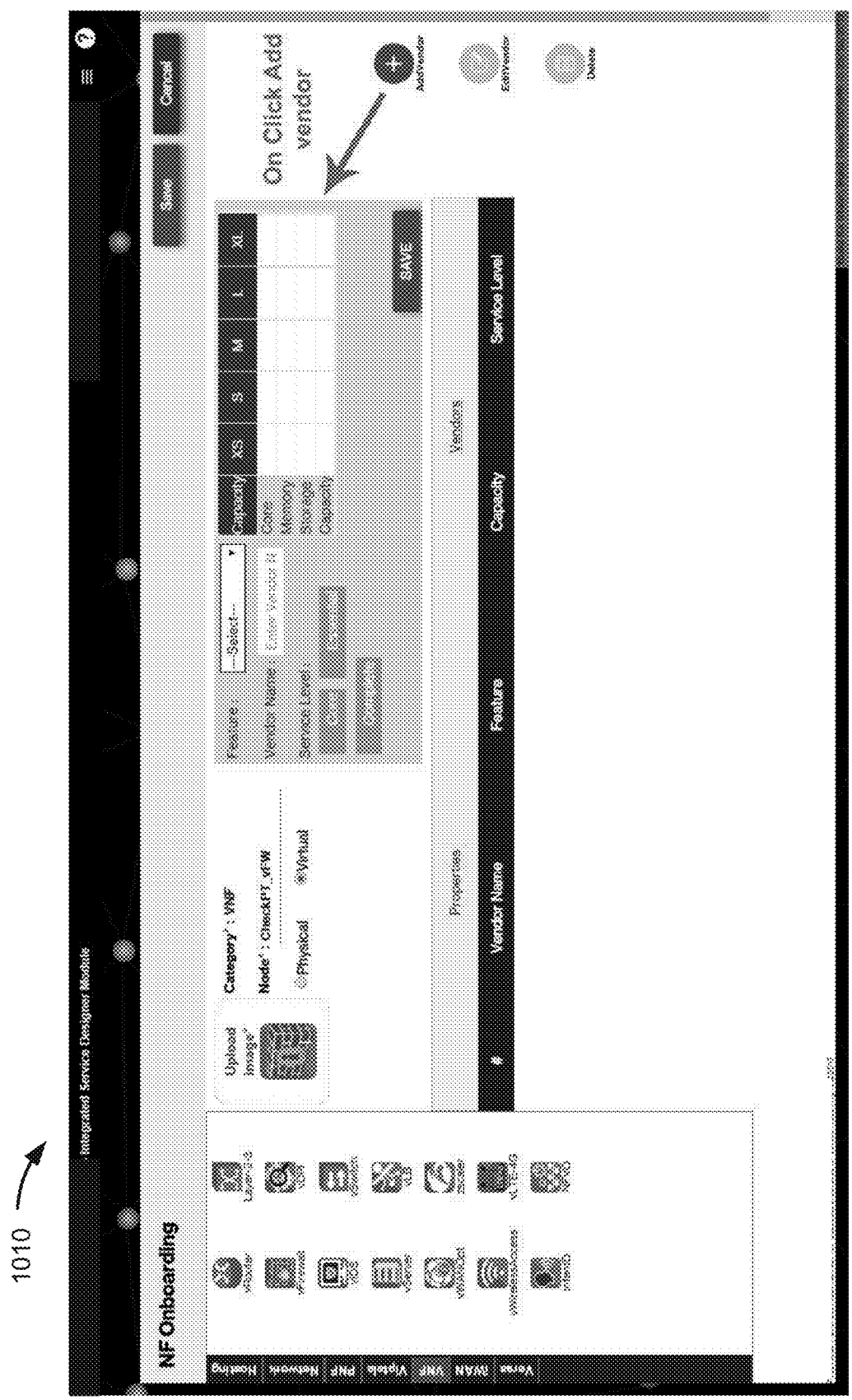
Figure 10G:
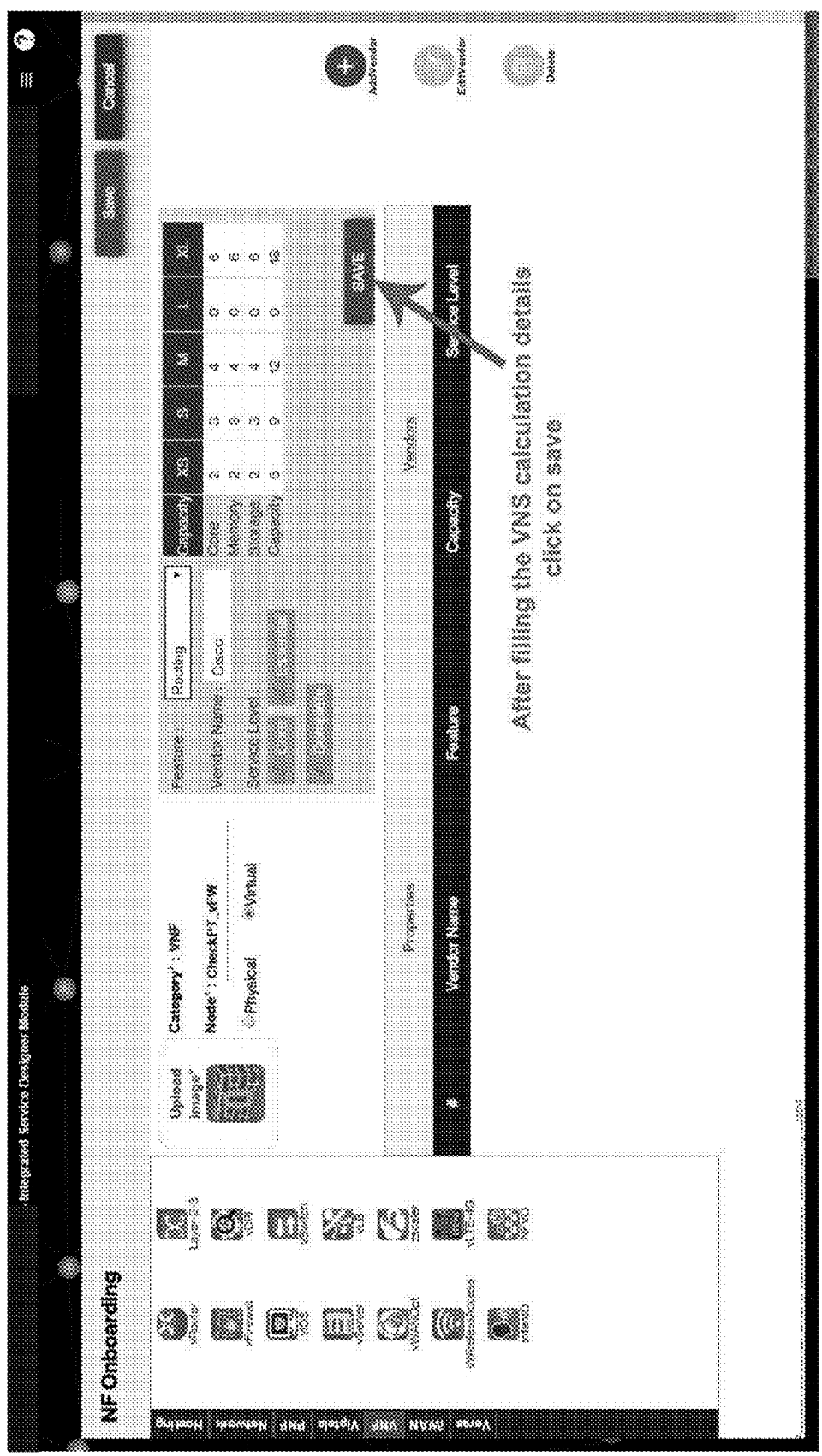
Figure 10H:
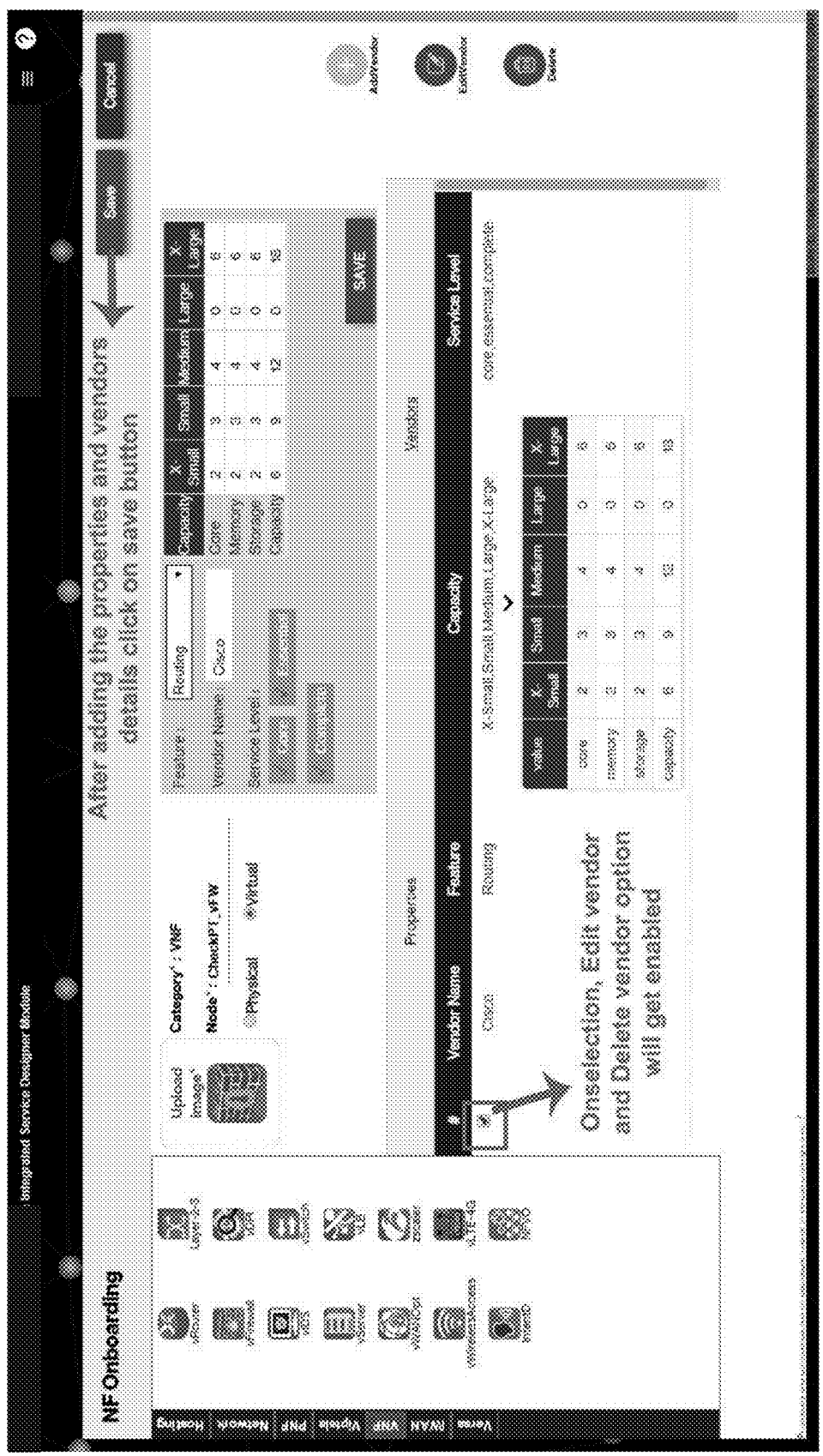
Figure 10I:
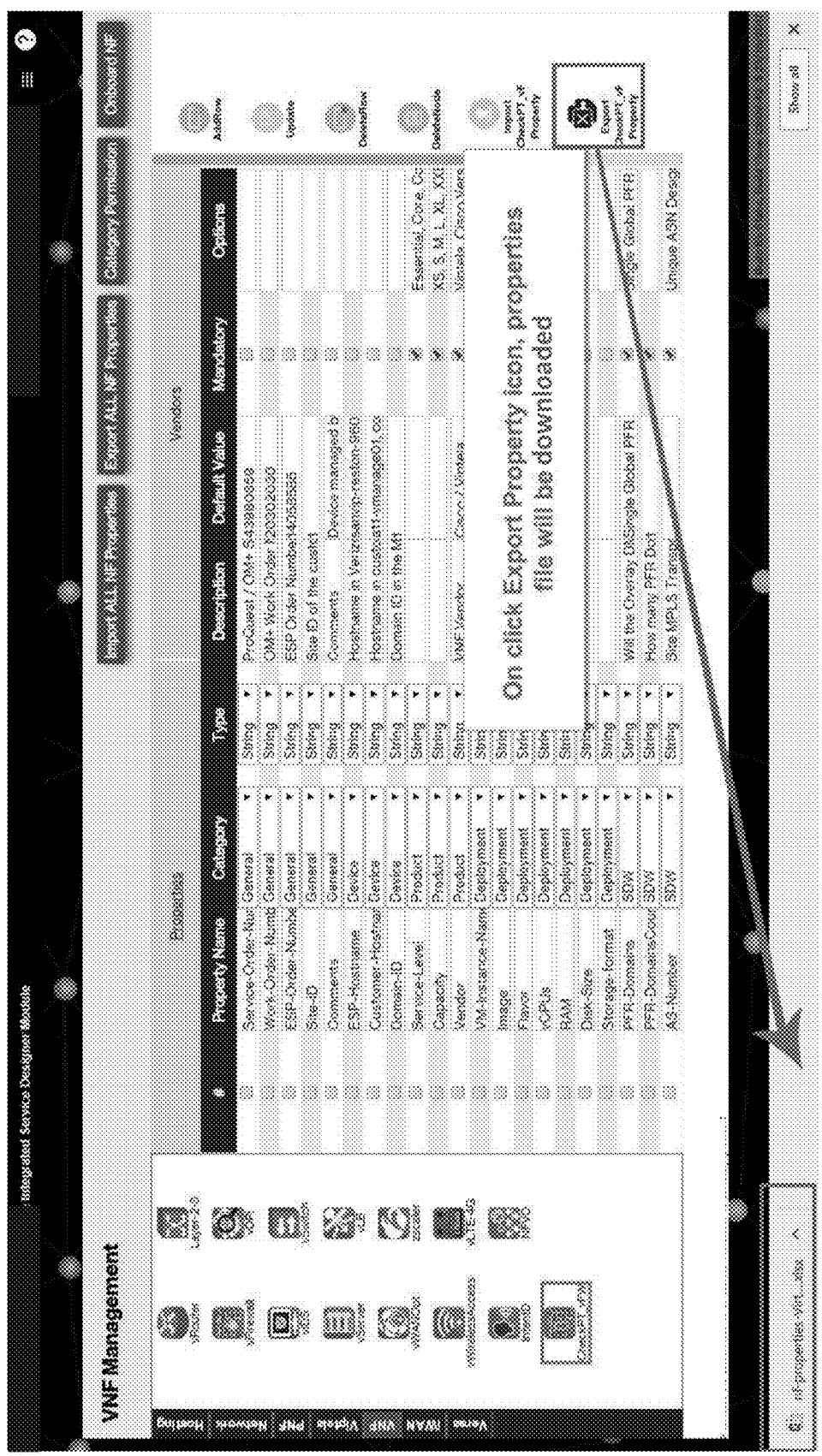
Figure 10J:
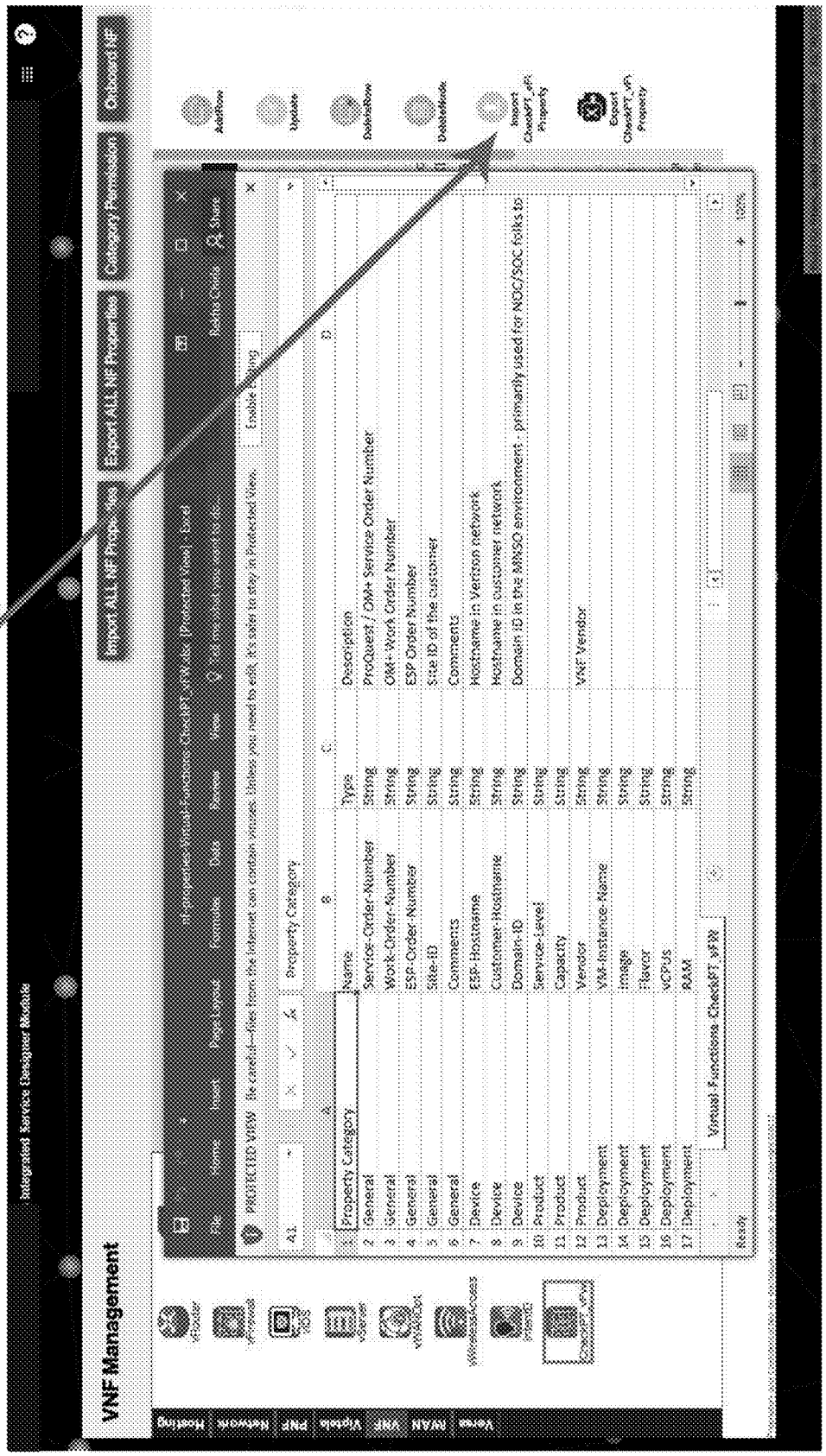
Figure 10K:
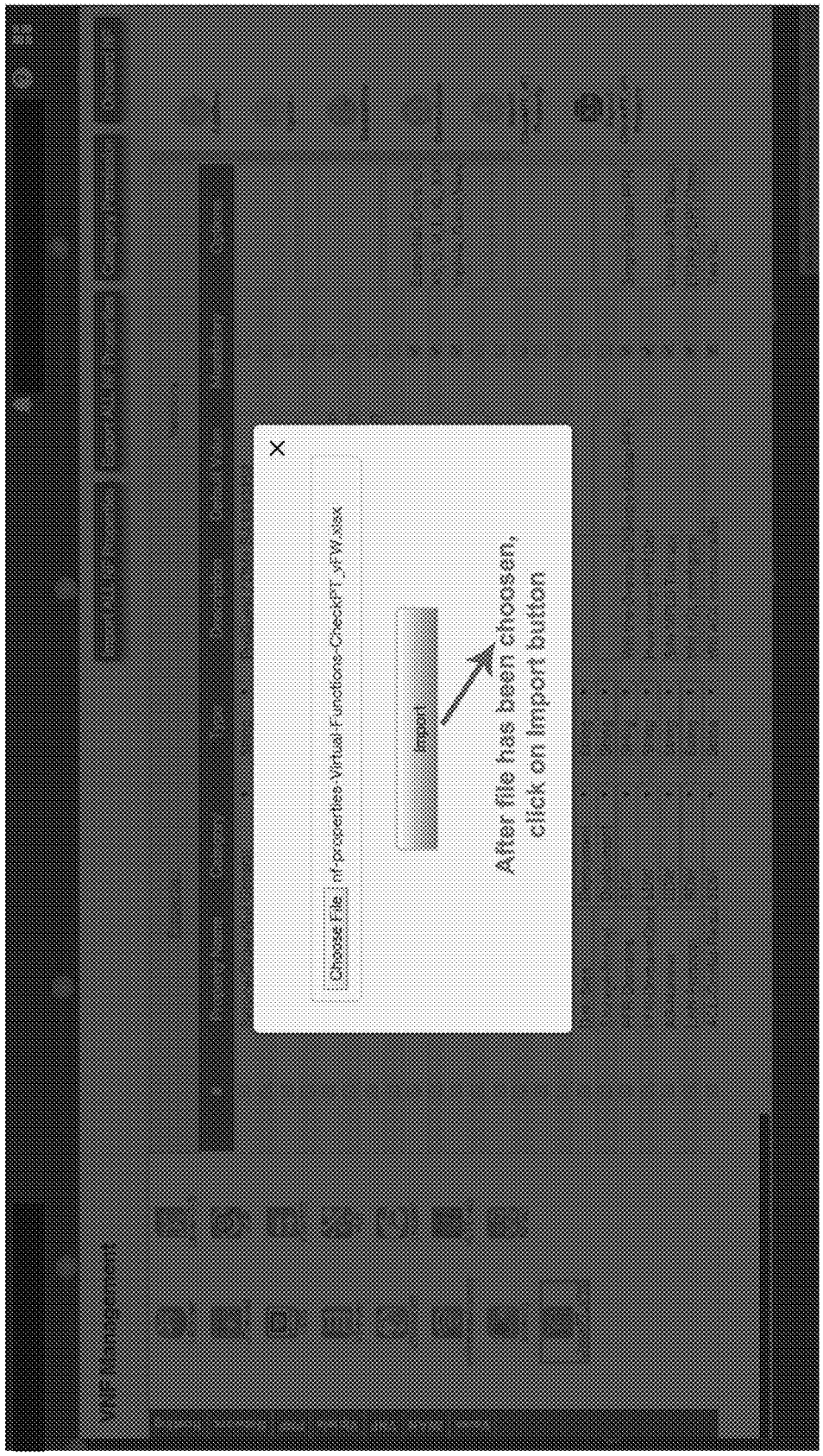

Process 900 may also include associating the icons with network properties based on user input (block 920). For example, as shown in FIG. 10C, selecting one of the tabs from the design pallet (corresponding, e.g., to tabs 710, 720, 730, 740, 750, 760, or 770 of design pallet 610 in FIG. 7) causes a category of icons to be presented to the user (e.g., VNF icons for the VNF tab). Referring to FIG. 10D, a user may select an existing icon from the active design pallet category tab to edit or upload an icon for new properties. A user may assign a node name, and associate particular properties with the node name. Nodes in onboarding page 1010 may be associated with physical network elements or virtual network elements. Administrator UI component 410 may provide structured property inputs for physical nodes. For virtual nodes, administrator UI component 410 may also solicit information for a vendor that provides the virtual network function, as shown in FIGS. 10E-10H. According to one implementation, properties of a node/icon from design pallet 610 may be exported to a data file, edited, and imported as a new node to allow for simplified entry of similar node types, as shown in FIGS. 10I-10K.

Figure 11:
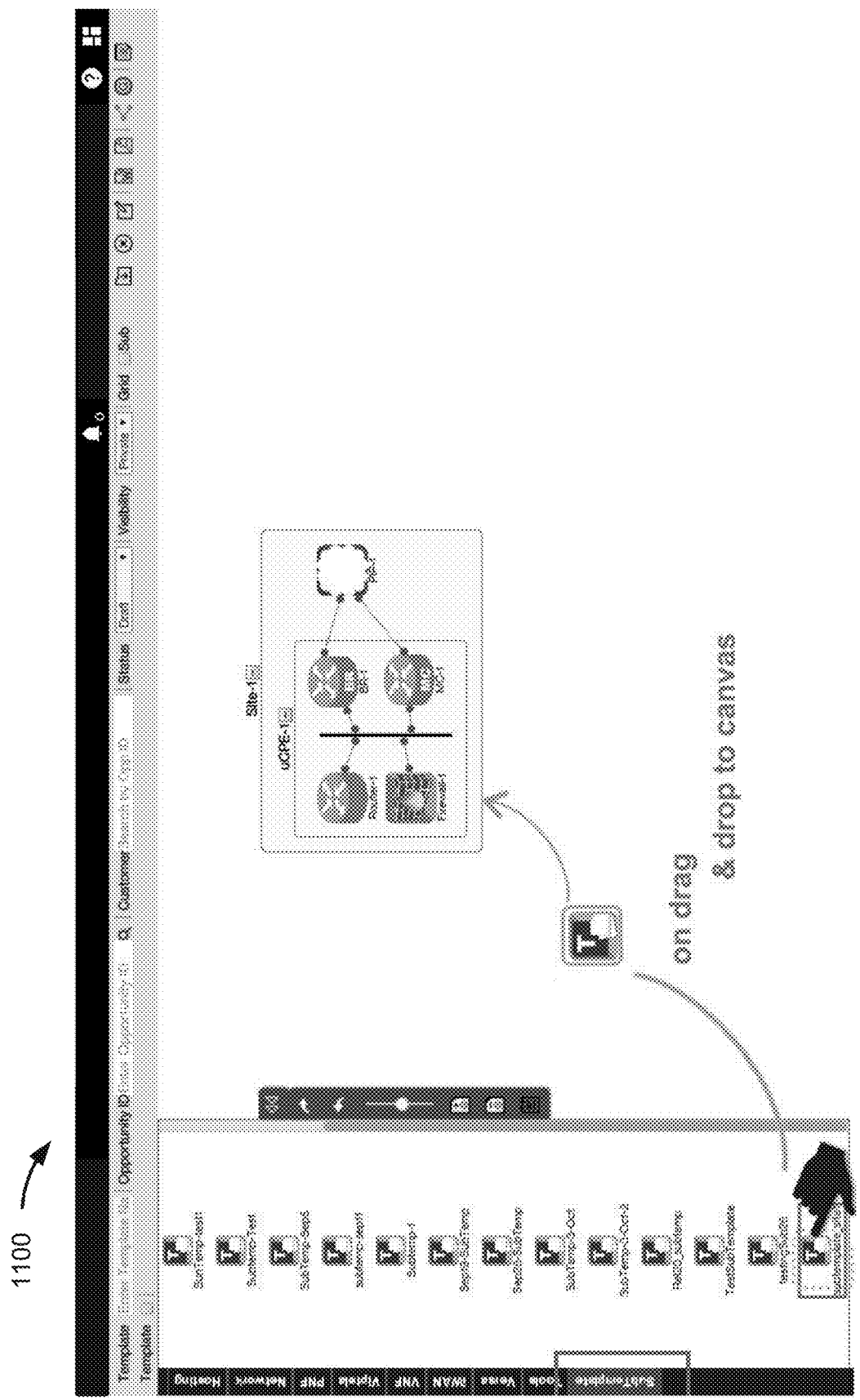
FIG. 11 is an example of a screen image generated by the design user interface component of the graphical network design and configuration tool.

Process 900 may also include providing a design GUI including a design canvas to arrange and connect the icons (block 930) and receive, via the design GUI, user input to arrange icons on the design canvas for a network-based service (block 940). For example, design UI component 420 may provide a design page including design pallet 610 and design canvas 620. Referring to FIG. 11, a design page 1100 may include a GUI with a design canvas for a user to arrange and connect selected icons from a design pallet.

Process 900 may further include generating, based on the second user input, a design template for the network-based service (block 950). For example, an arrangement of icons from design canvas 620 may be validated through communications with OSS/BSS 310 and service orchestrator 320. For example, OSS/BSS 310 may validate whether vendor equipment associated with an icon is compatible with the design for the network-based service. Network properties of the nodes and links represented by the icons may be compiled and stored as a network design template for a particular network-based service or product. In another implementation, the network design template may be stored associated with a particular customer or customer network 140.

Figure 12A:
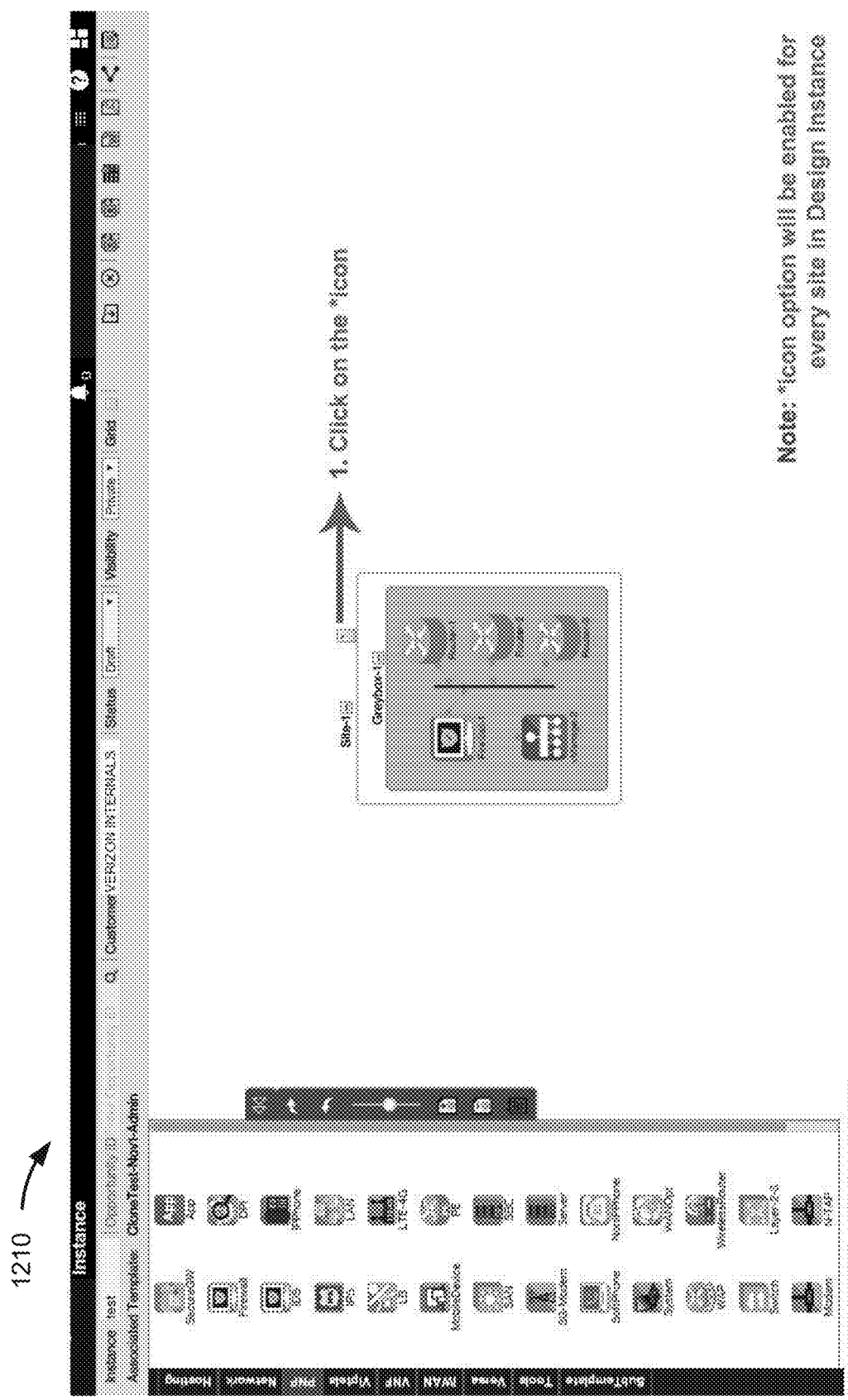
FIGS. 12A-12K are examples of screen images generated by the configuration user interface component of the graphical network design and configuration tool.
Figure 12B:
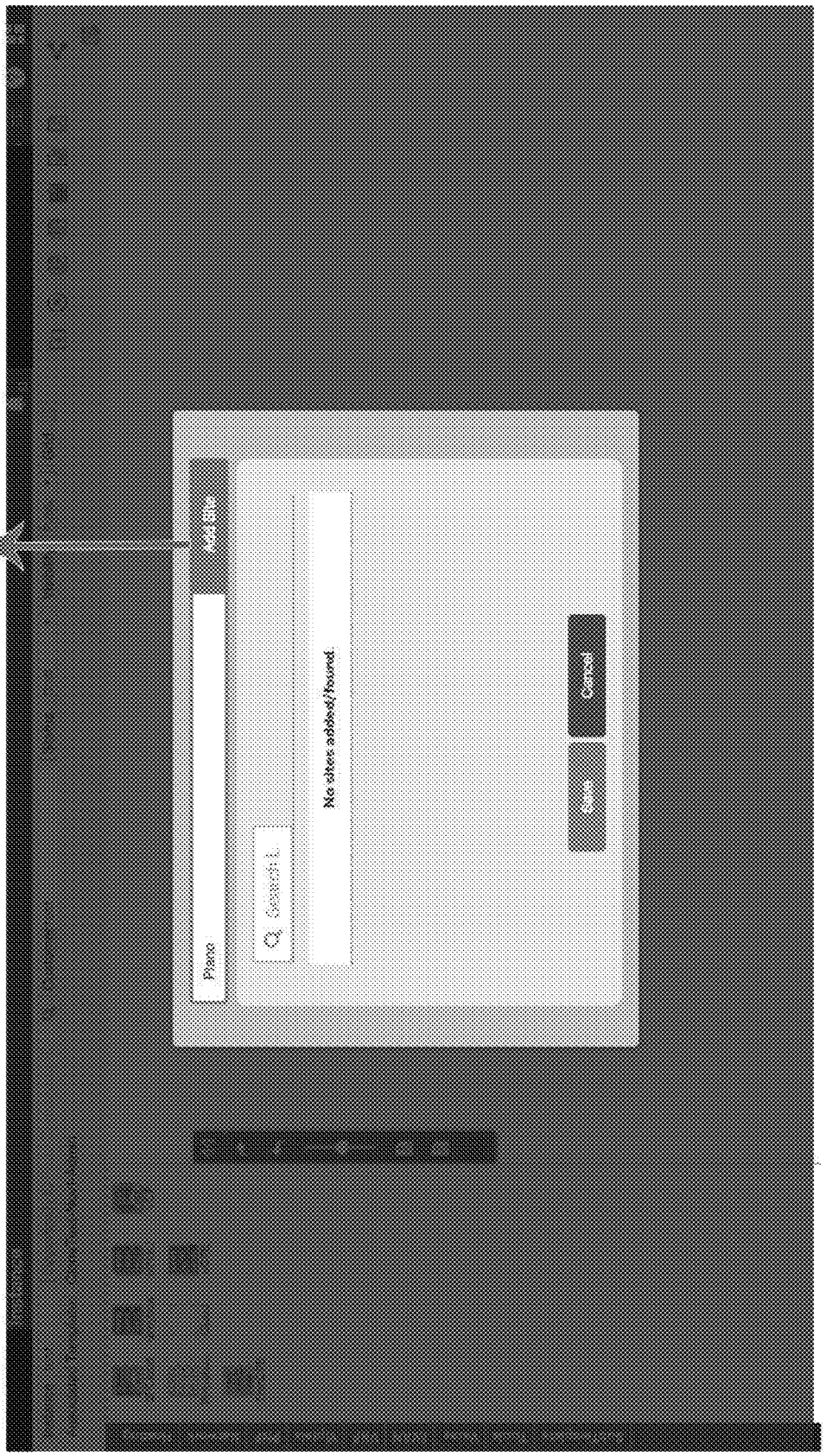
Figure 12C:
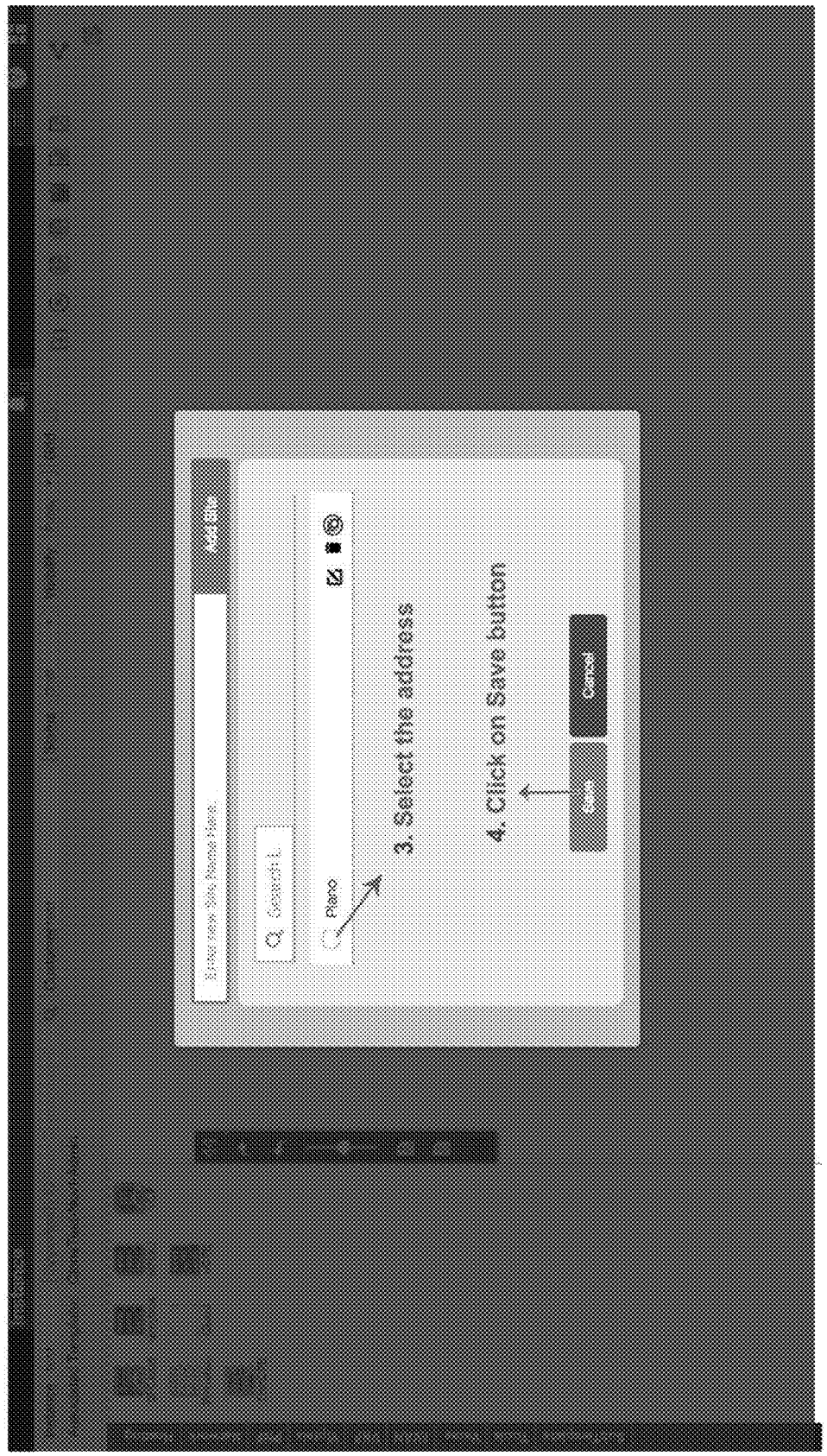
Figure 12D:
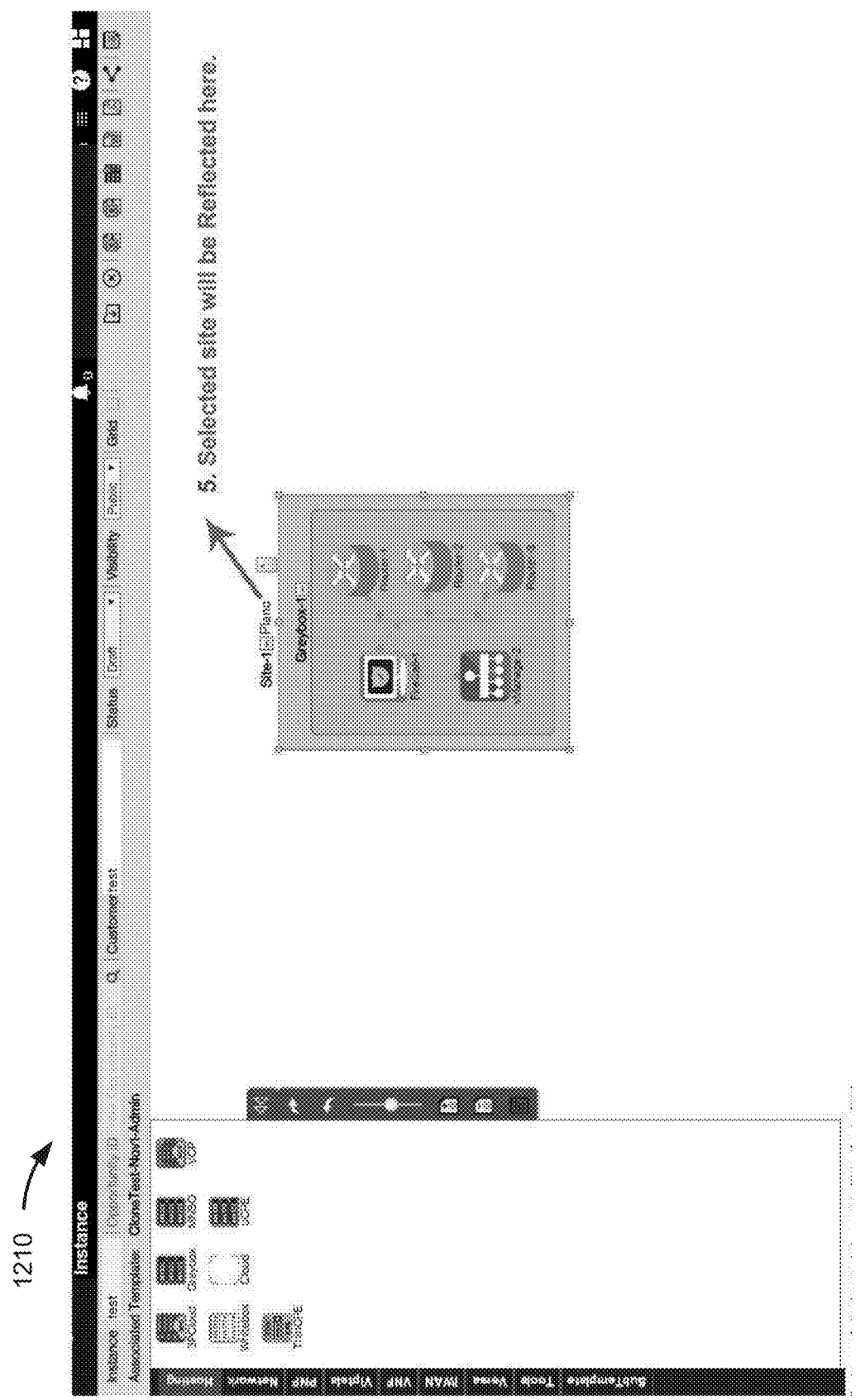
Figure 12E:
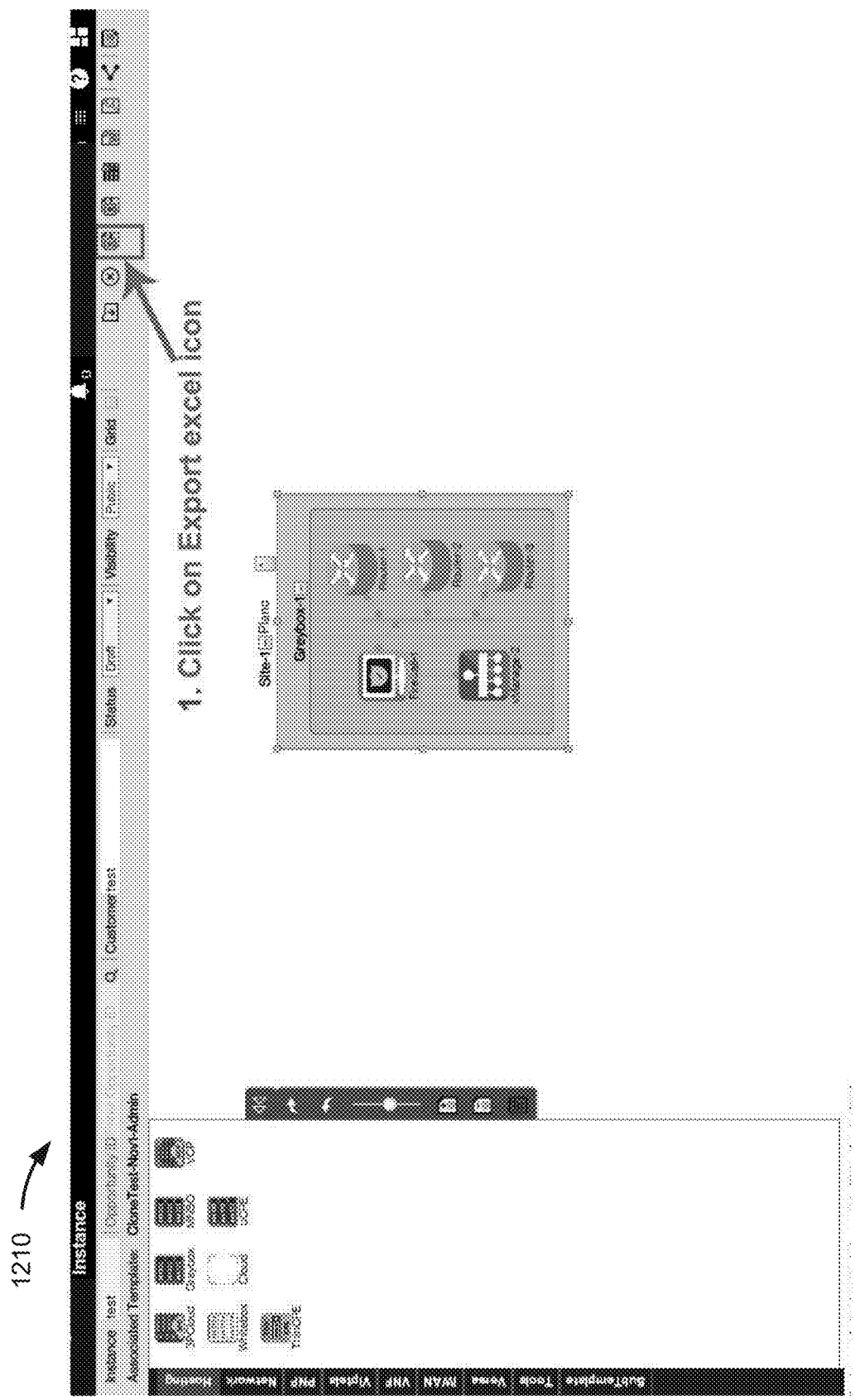
Figure 12F:
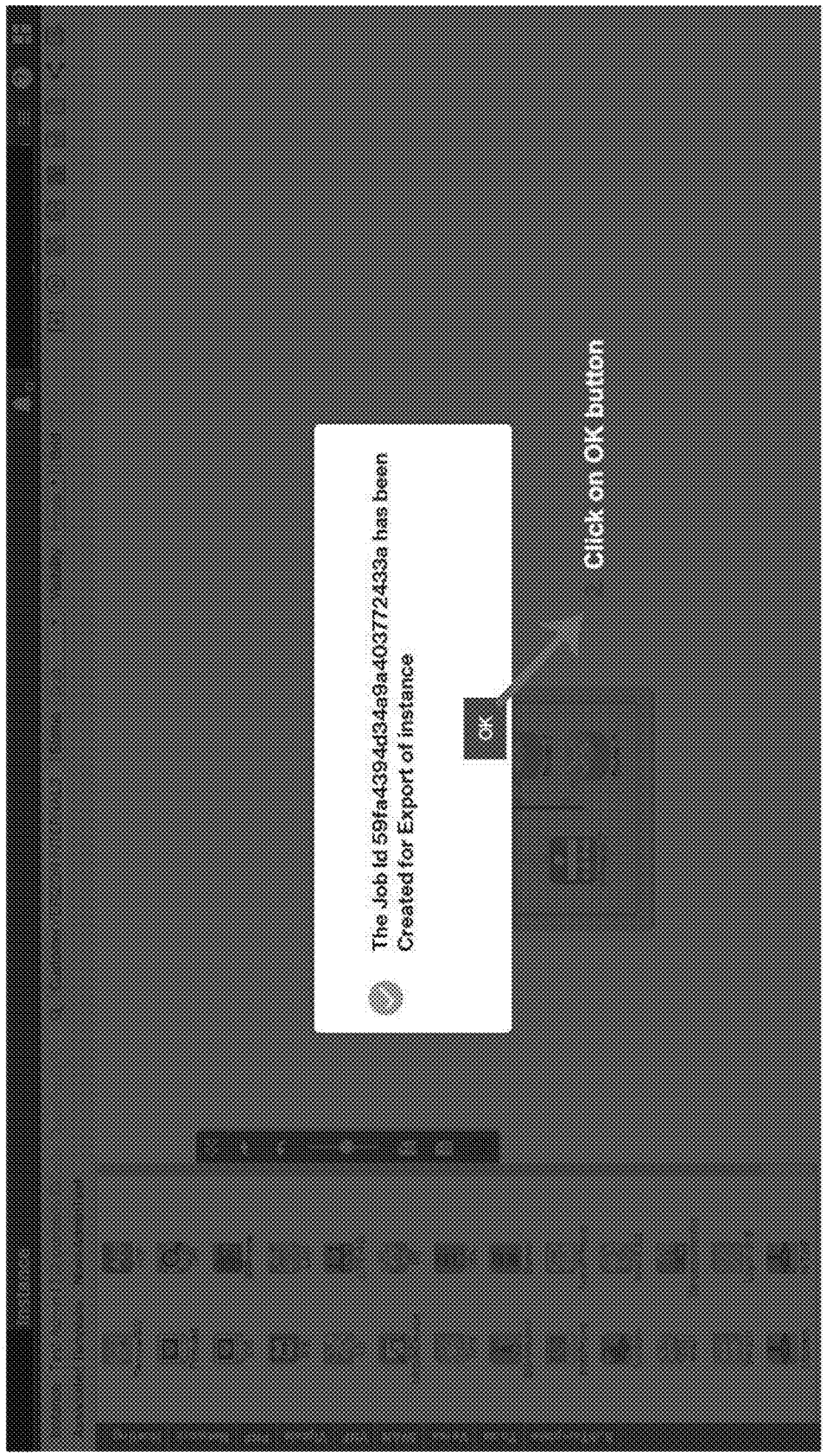
Figure 12G:
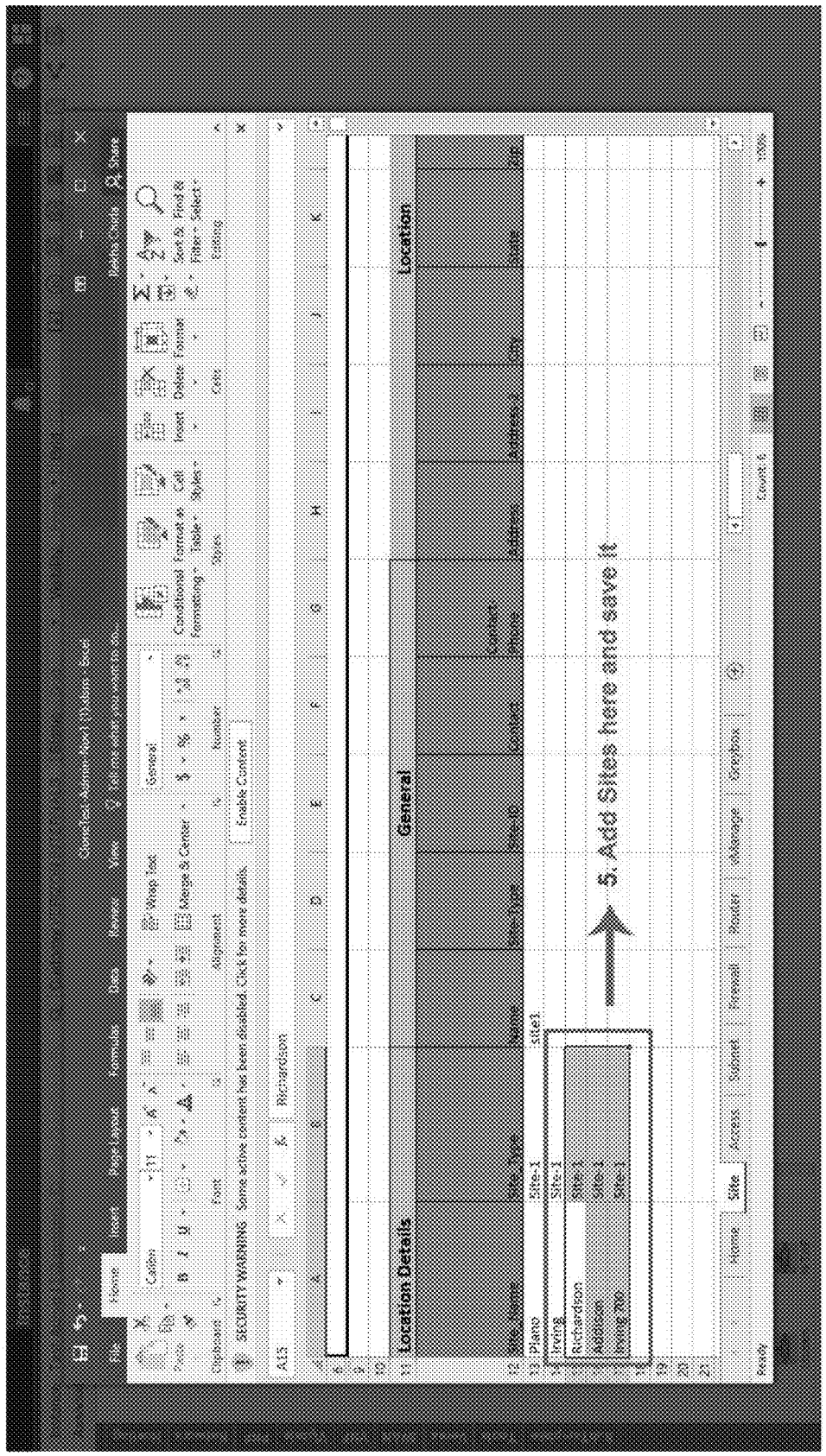
Figure 12H:
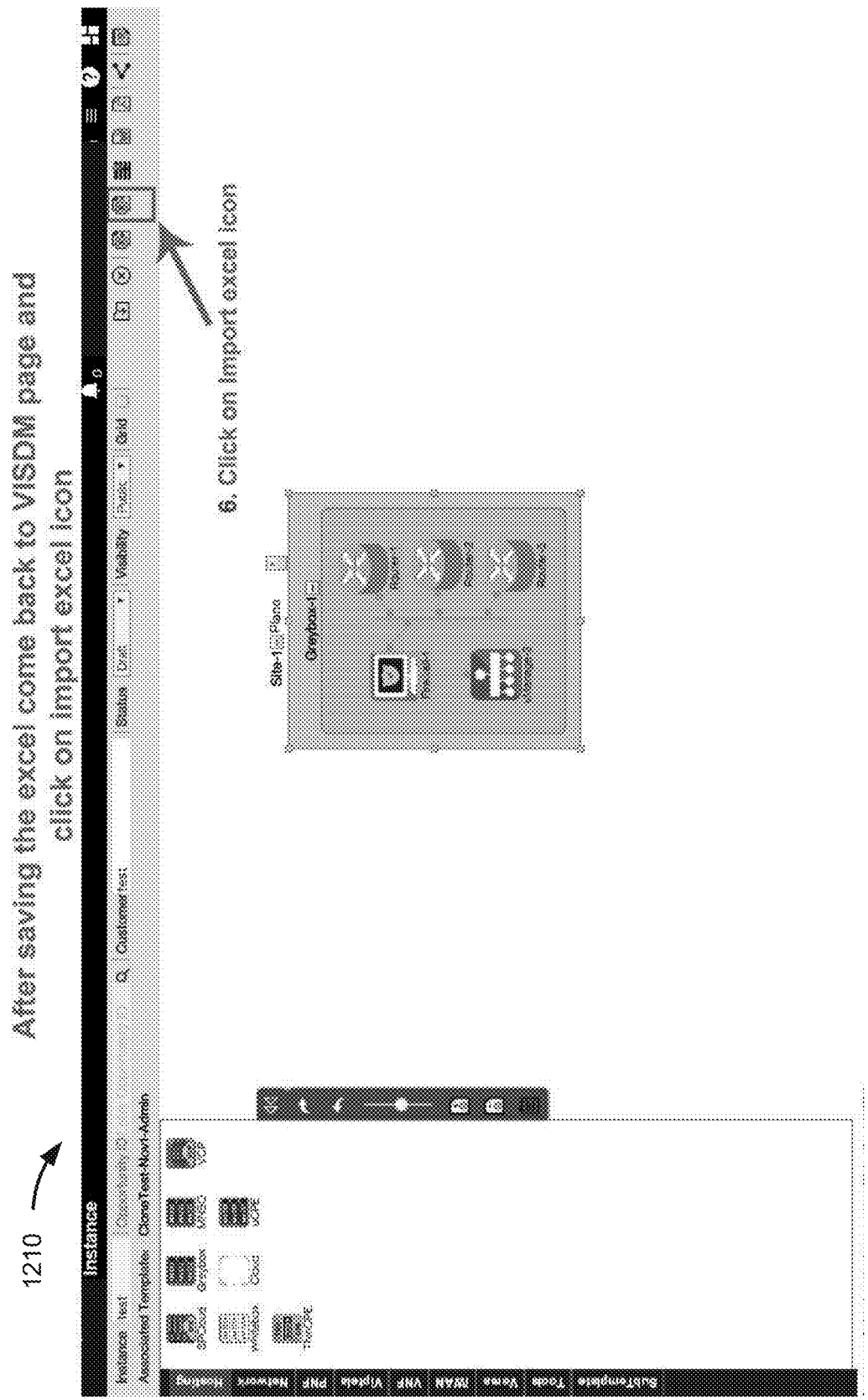
Figure 12I:
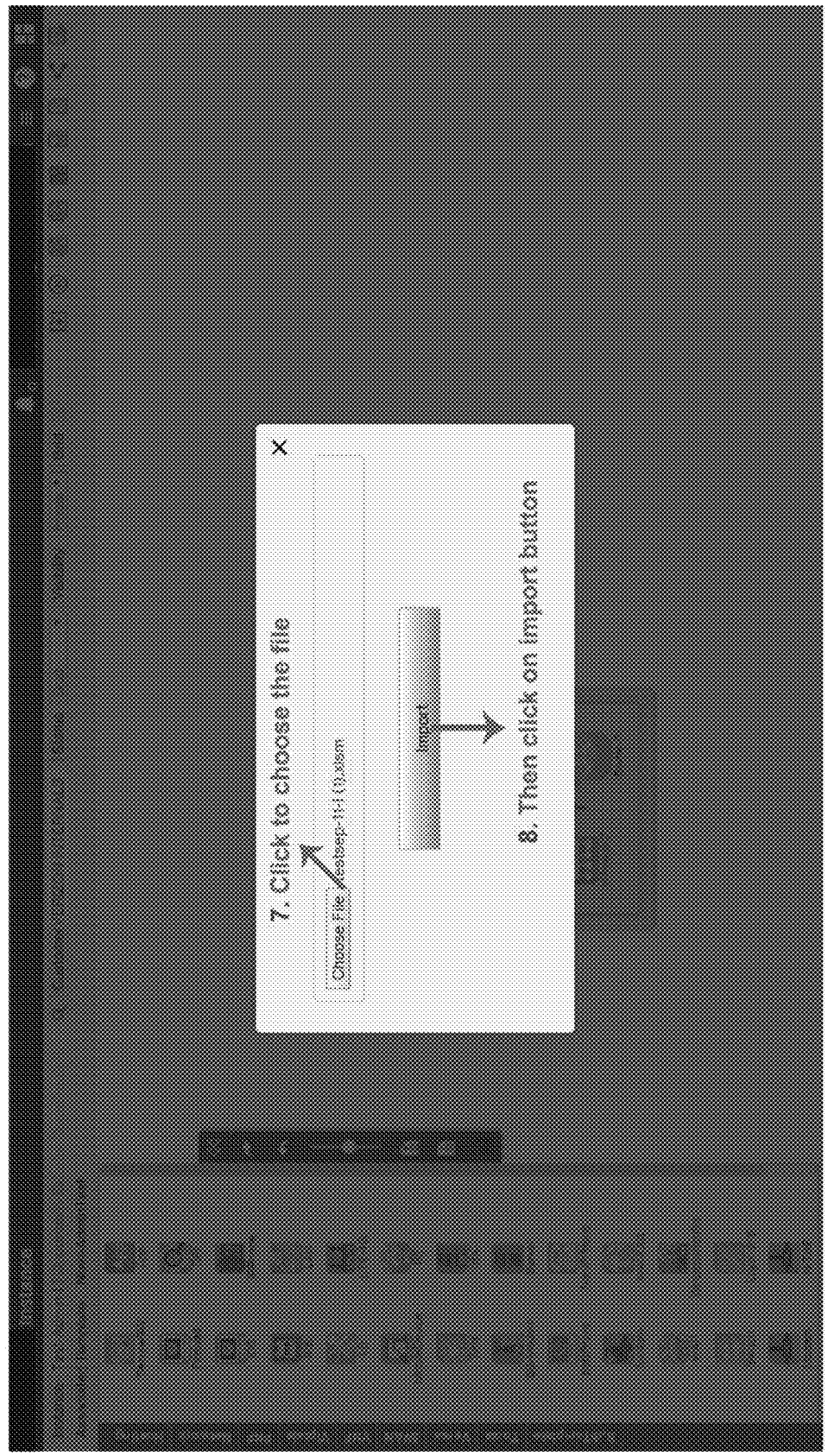
Figure 12J:
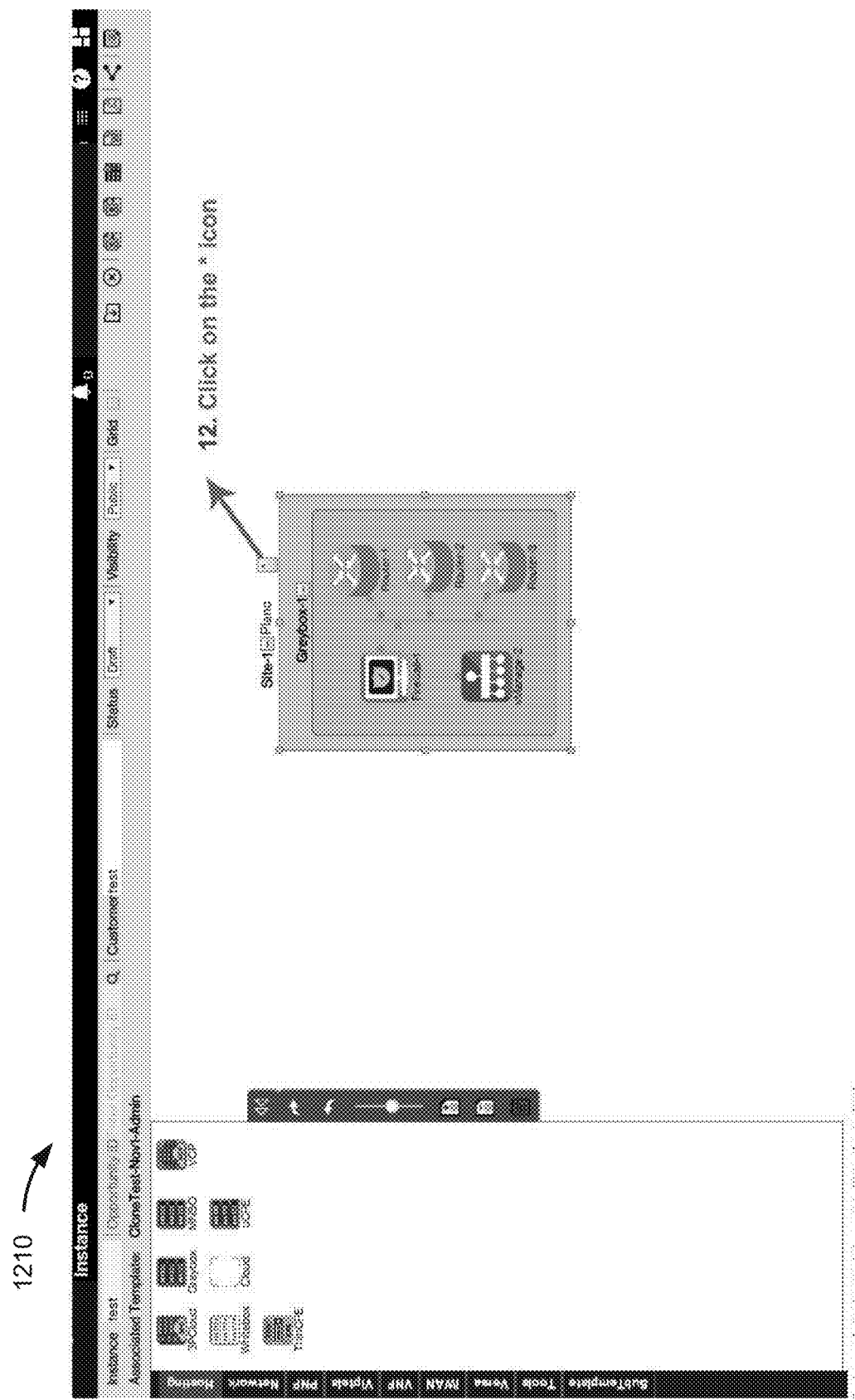
Figure 12K:
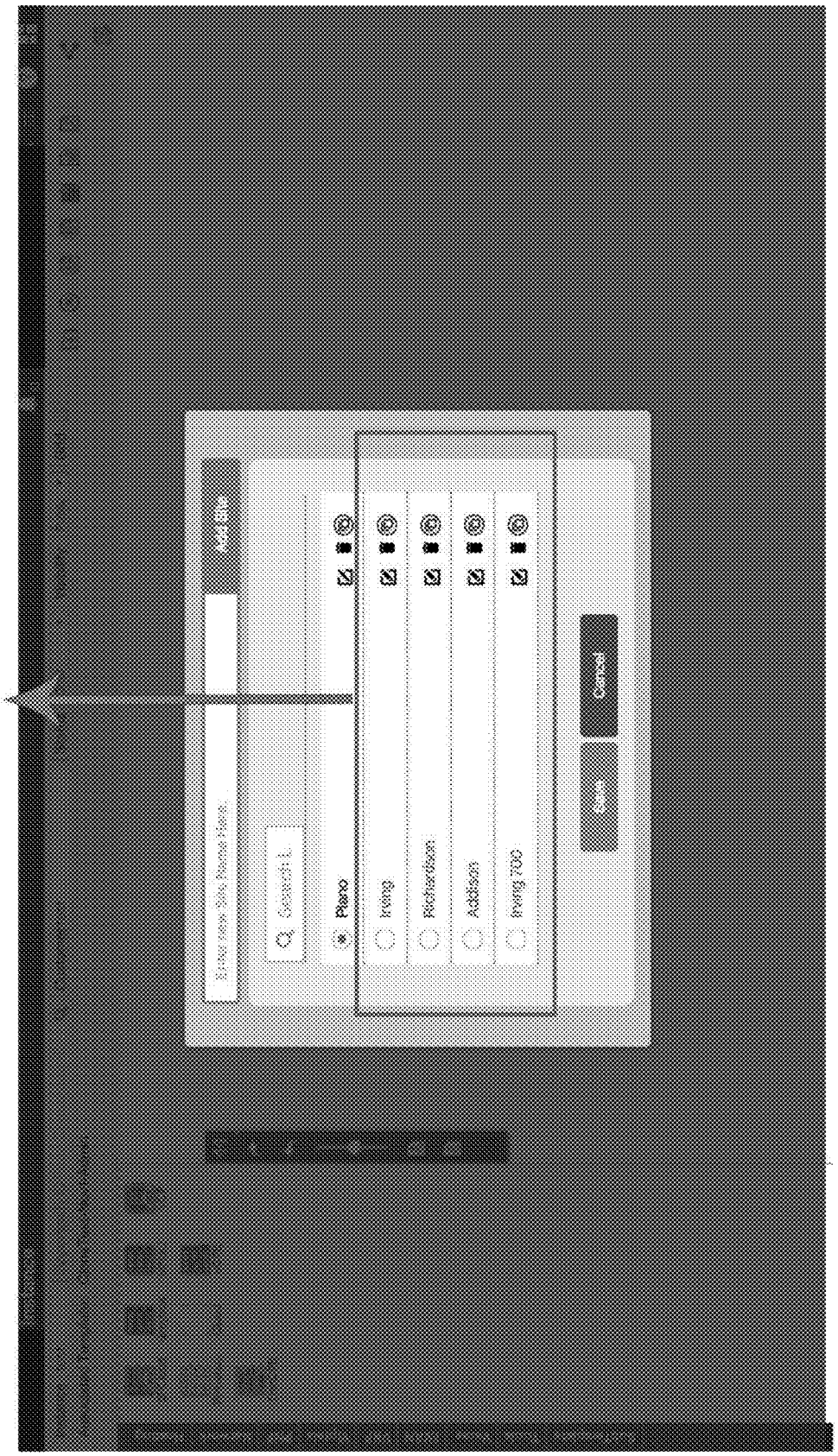

Process 900 may additionally include soliciting, via a configuration GUI, network level attributes, associated with a service location, for network elements in the design template (block 960), and creating an instance of the design template based on the first network level attributes (block 970). For example, configuration UI component 430 may provide a configuration page to apply a design template to a particular location instance. Referring to FIGS. 12A-12D, in one implementation, instance page 1210 may solicit input from a user to select or enter a location to associate with a stored template. Referring to FIGS. 12E-12I, according to another implementation, configuration UI component 430 may generate a data file, based on a design template, that can be exported, edited with new locations, and then imported to create a design instance for each particular location. In any event, as shown in FIGS. 12J and 12K, new locations for different design instances may be listed and presented for selection by a user. For each location/design instance, configuration UI component 430 may solicit from a user network level attributes, such as IP addresses, VLAN tags, etc., for each network element to create an instance of a given network service template for the particular location.

Figure 13A:
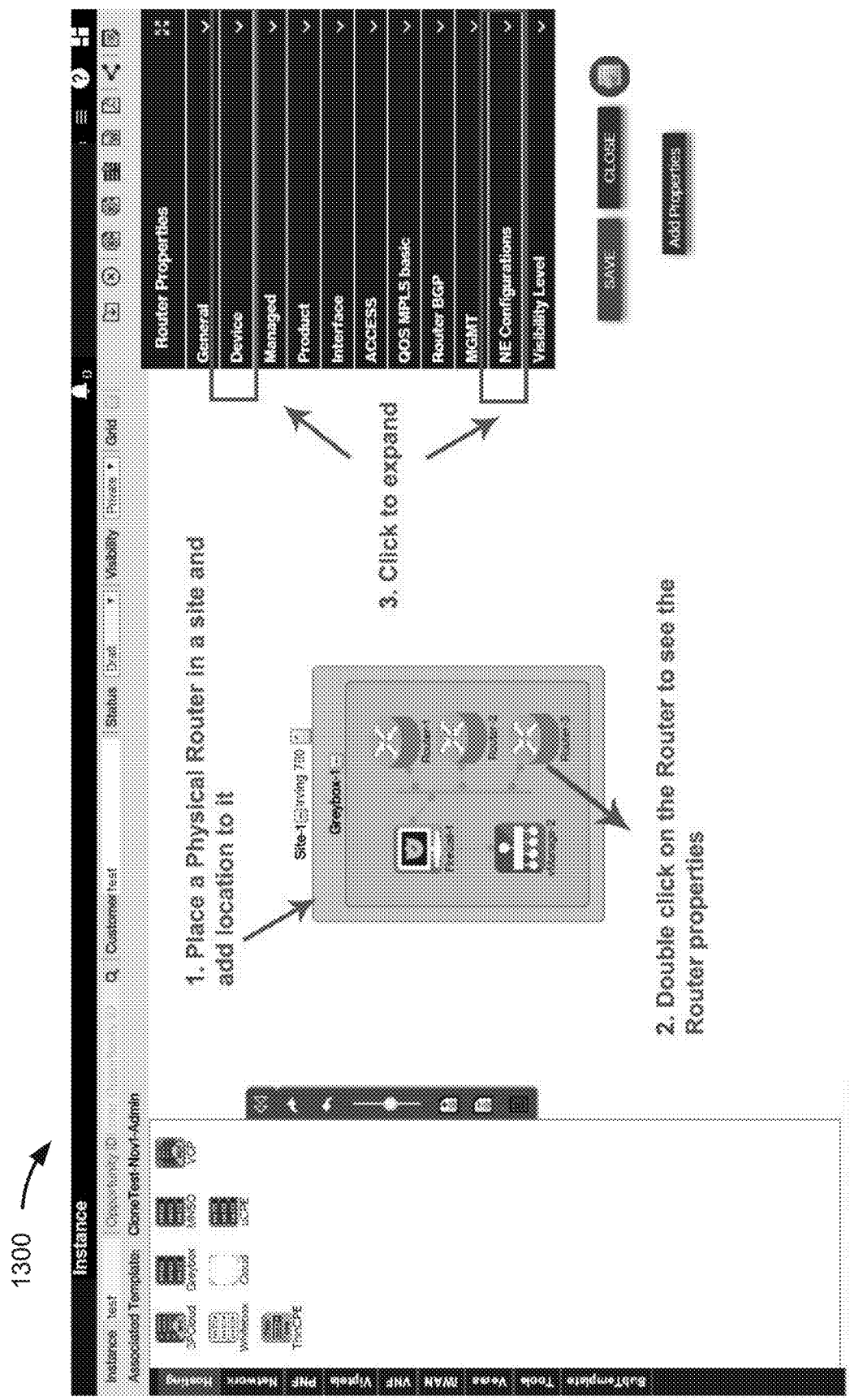
FIGS. 13A-13C are examples of additional screen images generated by the configuration user interface component of the graphical network design and configuration tool.
Figure 13B:
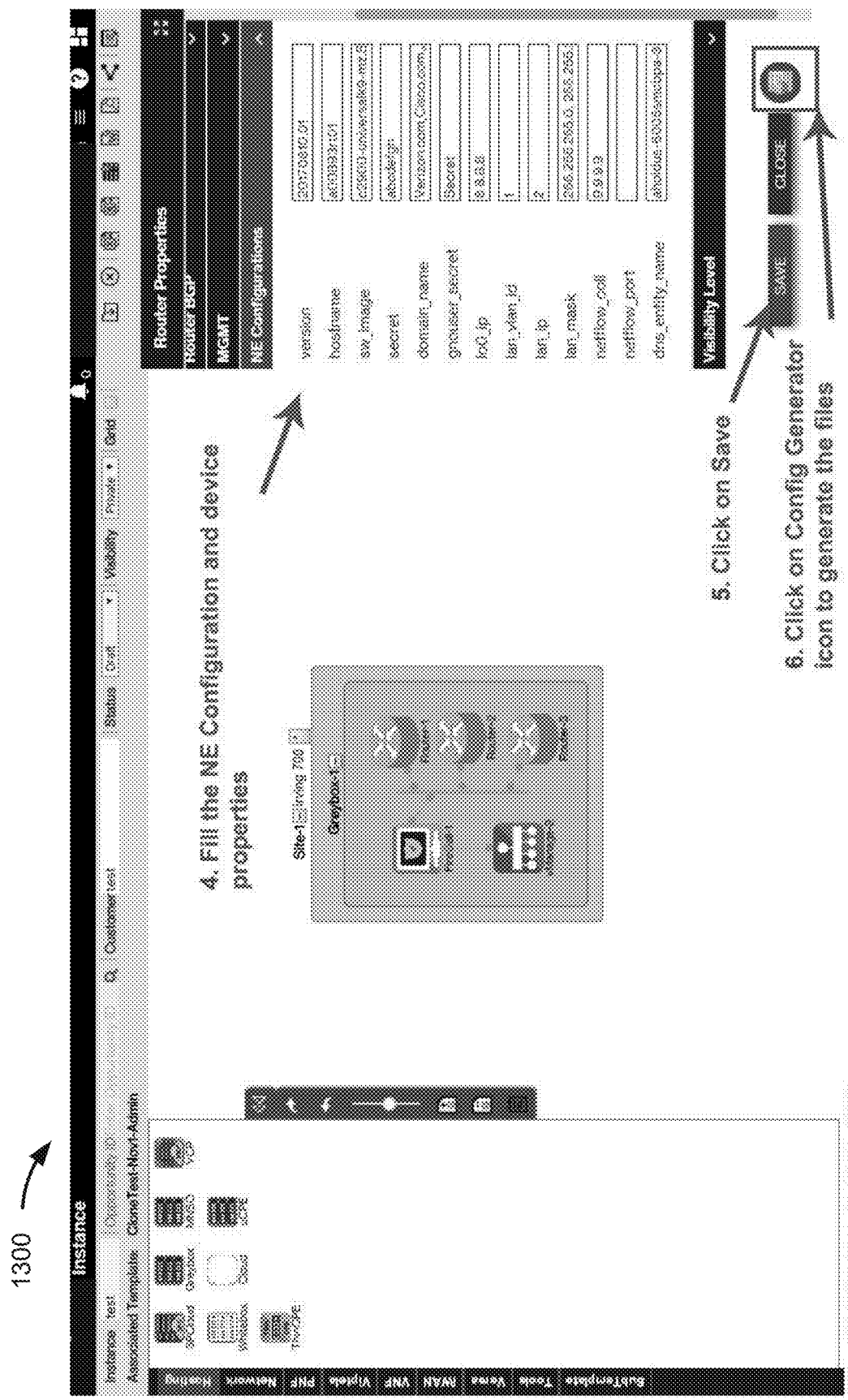
Figure 13C:
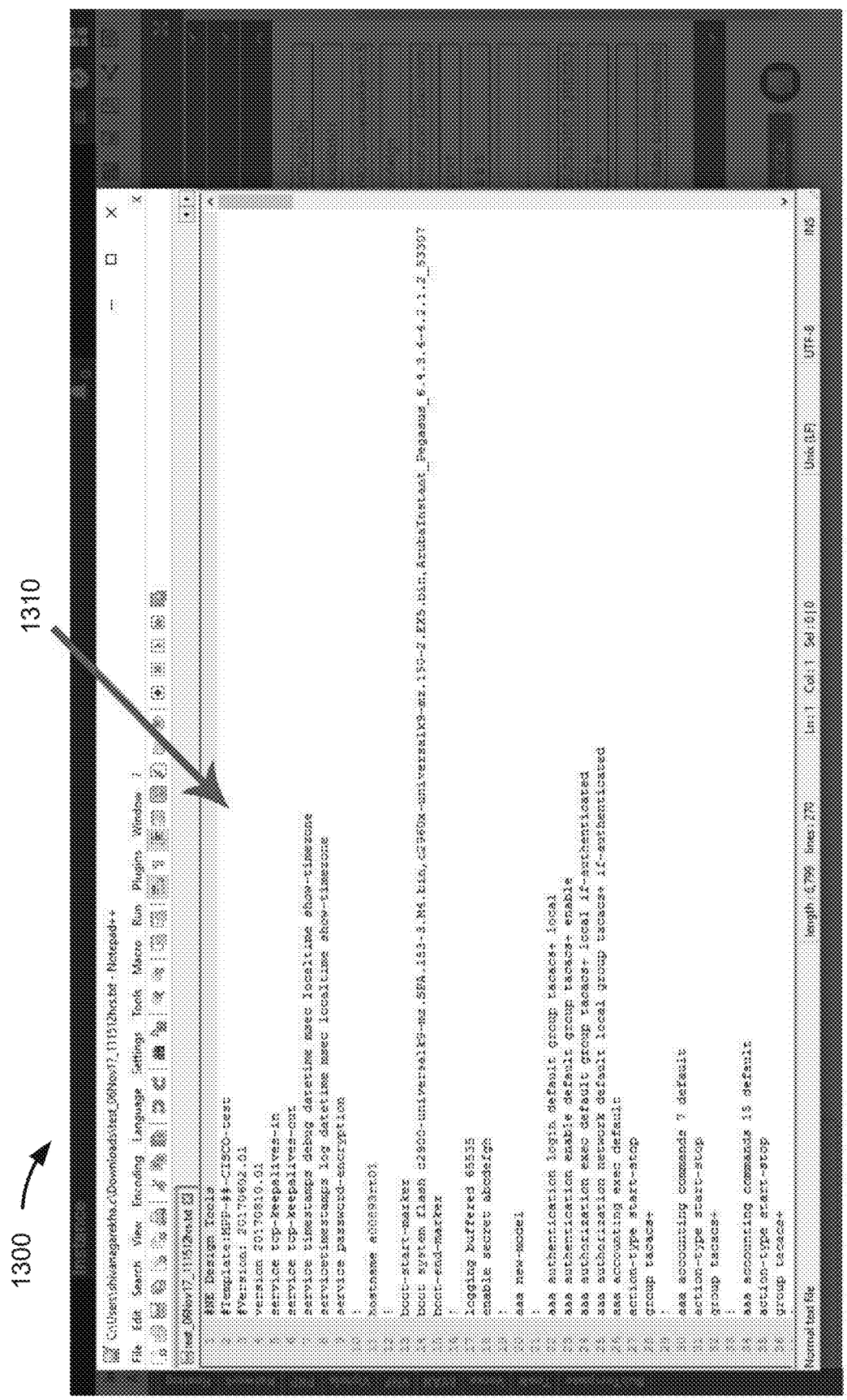

Process 900 may also include generating configuration files for the physical NEs in the instance of the design template (block 980). For example, configuration UI component 430 may use the instance of the design template automatically configuring network elements for the network-based service. Configuration files may be automatically generated for new or previously configured physical network elements. Referring to FIGS. 13A-13B, in one implementation, a user may select a new physical network element (e.g., a router) from a design canvas in instance page 1300. The user may use structured input criteria provided in instance page 1300 to provide configuration and device properties, if not previously entered. The user may then select a "Config Generator" option or icon to cause configuration UI component 430 to generate a configuration file for the particular physical network element. Configuration UI component 430 may automatically select a configuration file template that matches the configuration and device properties provided for the physical network element. As shown in FIG. 13C, configuration UI component 430 may automatically generate a configuration file 1310, for example, in command line interface (CLI) format.

Process 900 may also include automatically deploying and configuring the network for the network-based service (block 990). For example, configuration files 1310 and location-specific instances of the design template may be provided to orchestrator devices (e.g., service orchestrator 320, end-to-end orchestrator 350) to enable automated end-to-end provisioning of a hybrid network and/or particular service for a network (e.g., customer network 140). Each local orchestrator may automate the deployment of its portion of the overall solution within its infrastructure domain, such as in a portion of access network 110, core network 120, and/or service provider network 130.

The foregoing description of embodiments provides illustration, but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive.

In addition, while series of blocks have been described with regard to the processes illustrated in FIG. 9, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 220, etc.), or a combination of hardware and software (e.g., software 235). The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 220) of a computational device. A non-transitory storage medium includes one or more of the storage mediums described in relation to memory 230.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
   providing, by one or more computing devices, a first graphical user interface (GUI) with icons that represent virtual network elements, physical network elements, and links used to deliver network-based services, wherein the icons are grouped into different categories in the first GUI;
   associating, by the one or more computing devices and via the first GUI, the icons with network properties based on first user input, wherein the network properties correspond to individual virtual network elements and physical network elements of a customer network, and wherein associating the icons with network properties includes:
     receiving, via the first GUI, a selection of one of the icons;
     providing, via the first GUI, structured input options associated with one of the different categories, wherein, when the selected icon represents a virtual network element, the structured input options include an option to select a vendor that provides the virtual network element; and
     receiving, via the first GUI and the structured input options, the network properties for one of the virtual network elements or physical network elements corresponding to the one of the categories represented by the selected icon;
   providing, by the one or more computing devices, a second GUI including a design canvas that allows a user to graphically arrange and connect the icons;
   receiving, by the one or more computing devices and via the second GUI, second user input to arrange at least some of the icons on the design canvas to provide a design for a network-based service;
   generating, by the one or more computing devices and based on the second user input, a design template for the network-based service;
   soliciting, by the one or more computing devices and via a third GUI, first network level attributes for the virtual network elements and the physical network elements in the design template, wherein the first network level attributes are associated with a first location;
   creating, by the one or more computing devices, an instance of the design template based on the first network level attributes;
   generating automatically, by the one or more computing devices, configuration files for the physical network elements represented in the instance of the design template, wherein the instance of the design template and the configuration files are used for automatically deploying and configuring a network for the network-based service.

2. The method of claim 1, wherein the first user input is imported from a data file of multiple network elements.

3. The method of claim 2, wherein the network properties include network service descriptors (NSD), virtual network function descriptors (VNFD), deployment descriptors, virtual network functions forwarding graph (VNFFG) information, link descriptors, and policy information.

4. The method of claim 1, wherein the design template for the network-based service includes Topology and Orchestration Specification for Cloud Applications (TOSCA) templates.

5. The method of claim 1, further comprising:
storing the design template associated with a particular customer.

6. The method of claim 5, further comprising:
soliciting via the third GUI, second network level attributes for network elements in the design template, wherein the second network level attributes are associated with a second location; and
creating another instance of the design template based on the second network level attributes.

7. The method of claim 1, wherein the associating further comprises:
providing, via the first GUI, structured input options to receive equipment identifiers; and
validating that equipment associated with the equipment identifiers is compatible with the design for the network-based service.

8. The method of claim 1, wherein the one or more computing devices include a network services orchestrator device.

9. The method of claim 1, wherein the one or more computing devices include an orchestrator device for each of multiple domains.

10. One or more devices comprising:
a communication interface;
a memory, wherein the memory stores instructions; and
a processor configured to execute the instructions to:
provide a first graphical user interface (GUI) with icons that represent virtual network elements, physical network elements, and links used to deliver network-based services, wherein the icons are grouped into different categories in the first GUI,
associate, via the first GUI, the icons with network properties based on first user input, wherein the network properties correspond to individual virtual network elements and physical network elements of a customer network, wherein, when associating the icons with network properties, the processor is further configured to execute the instructions to:
receive, via the first GUI, a selection of one of the icons;
provide, via the first GUI, structured input options associated with one of the different categories, wherein, when the selected icon represents a virtual network element, the structured input options include an option to select a vendor that provides the virtual network element; and
receive, via the first GUI and the structured input options, the network properties for one of the virtual network elements or physical network elements corresponding to the one of the categories represented by the selected icon;
provide a second GUI including a design canvas that allows a user to graphically arrange and connect the icons,
receive, via the second GUI, second user input to arrange at least some of the icons on the design canvas to provide a design for a network-based service,
generate, based on the second user input, a design template for the network-based service,
solicit, via a third GUI, first network level attributes for the virtual network elements and the physical network elements in the design template, wherein the first network level attributes are associated with a first location,
create an instance of the design template based on the first network level attributes, and
generate automatically configuration files for the physical network elements represented in the instance of the design template, wherein the instance of the design template and the configuration files are used for automatically deploying and configuring a network for the network-based service.

11. The one or more devices of claim 10, wherein the processor is further configured to execute the instructions to:
store, in the memory, the design template associated with a particular customer.

12. The one or more devices of claim 11, wherein the processor is further configured to execute the instructions to:
solicit via the third GUI, second network level attributes for network elements in the design template, wherein the second network level attributes are associated with a second location; and
create another instance of the design template based on the second network level attributes.

13. The one or more devices of claim 10, wherein the design template for the network-based service uses a data modeling language including one or more of Topology and Orchestration Specification for Cloud Applications (TOSCA) or YANG protocols.

14. The one or more devices of claim 10, wherein the one or more devices communicate, via the communication interface, with a network services orchestrator device for end-to-end orchestration.

15. The one or more devices of claim 10, wherein the first user input is imported from a data file of multiple network elements.

16. The one or more devices of claim 10, wherein the one or more devices include an orchestrator device for each of multiple domains.

17. A non-transitory, computer-readable storage medium storing instructions executable by a processor of a computational device, which when executed cause the computational device to:
provide a first graphical user interface (GUI) with icons that represent virtual network elements, physical network elements, and links used to deliver network-based services, wherein the icons are grouped into different categories in the first GUI;
associate, via the first GUI, the icons with network properties based on first user input, wherein the network properties correspond to individual virtual network elements and physical network elements of a customer network, wherein the instructions to associate the icons with network properties further include instructions, which when executed cause the computational device to:

receive, via the first GUI, a selection of one of the icons;

provide, via the first GUI, structured input options associated with one of the different categories, wherein, when the selected icon represents a virtual network element, the structured input options include an option to select a vendor that provides the virtual network element; and receive, via the first GUI and the structured input options, the network properties for one of the virtual network elements or physical network elements corresponding to the one of the categories represented by the selected icon;

provide a second GUI including a design canvas that allows a user to graphically arrange and connect the icons;

receive, via the second GUI, second user input to arrange at least some of the icons on the design canvas to provide a design for a network-based service;

generate, based on the second user input, a design template for the network-based service, solicit, via a third GUI, first network level attributes for the virtual network elements and the physical network elements in the design template, wherein the first network level attributes are associated with a first location;

create an instance of the design template based on the first network level attributes; and generate automatically configuration files for the physical network elements represented in the instance of the design template, wherein the instance of the design template and the configuration files are used for automatically deploying and configuring a network for the network-based service.

18. The non-transitory, computer-readable medium of claim 17, further storing instructions, which when executed cause the computational device to:

solicit via the third GUI, second network level attributes for network elements in the design template, wherein the second network level attributes are associated with a second location; and create another instance of the design template based on the second network level attributes.

19. The non-transitory, computer-readable storage medium of claim 17, wherein the instructions to associate the icons with network properties further include instructions, which when executed cause the computational device to:

provide, via the first GUI, structured input options to receive equipment identifiers; and validate that equipment associated with the equipment identifiers is compatible with the design for the network-based service.

20. The non-transitory, computer-readable medium of claim 17, wherein the computational device includes a network services orchestrator device.

* * * * *